United States Patent
Shibata et al.

(10) Patent No.: US 7,834,916 B2
(45) Date of Patent: Nov. 16, 2010

(54) VIDEO CONTENT EDITING SUPPORT SYSTEM AND METHOD

(75) Inventors: Yoshiaki Shibata, Kanagawa (JP); Ryosuke Hayashi, Kanagawa (JP); Hiroshi Kajita, Kanagawa (JP); Takumi Yoshida, Kanagawa (JP)

(73) Assignee: Sony Corporation, Tokyo (JP)

( * ) Notice: Subject to any disclaimer, the term of this patent is extended or adjusted under 35 U.S.C. 154(b) by 460 days.

(21) Appl. No.: 10/510,113

(22) PCT Filed: Apr. 3, 2003

(86) PCT No.: PCT/JP03/04295

§ 371 (c)(1),
(2), (4) Date: Oct. 4, 2004

(87) PCT Pub. No.: WO03/085970

PCT Pub. Date: Oct. 16, 2003

(65) Prior Publication Data

US 2005/0152665 A1    Jul. 14, 2005

(30) Foreign Application Priority Data

Apr. 5, 2002    (JP) ............................. 2002-104179

(51) Int. Cl.
*H04N 5/76* (2006.01)
*H04N 5/93* (2006.01)

(52) U.S. Cl. ...................................... 348/231.6; 386/64

(58) Field of Classification Search .................. 386/4, 386/52, 55, 61, 64; 348/231.3, 231.6
See application file for complete search history.

(56) References Cited

U.S. PATENT DOCUMENTS

| | | | | |
|---|---|---|---|---|
| 6,690,883 | B2 * | 2/2004 | Pelletier | 396/321 |
| 7,110,025 | B1 * | 9/2006 | Loui et al. | 348/220.1 |
| 2001/0031131 | A1 * | 10/2001 | Fukai et al. | 386/52 |

FOREIGN PATENT DOCUMENTS

| | | | |
|---|---|---|---|
| GB | 2361097 A | * | 10/2001 |
| GB | 2361130 A | * | 10/2001 |
| JP | 64 82667 | | 3/1989 |
| JP | 1 187858 | | 7/1989 |
| JP | 5 282380 | | 10/1993 |
| JP | 7 193205 | | 7/1995 |
| JP | 9-130736 | | 5/1997 |
| JP | 2983642 | | 9/1999 |
| JP | 2001 251581 | | 9/2001 |
| JP | 2001-292406 | | 10/2001 |
| JP | 2001 292406 | | 10/2001 |
| WO | WO 97/10673 | | 3/1997 |

* cited by examiner

*Primary Examiner*—Timothy J Henn
(74) *Attorney, Agent, or Firm*—Frommer, Lawrence & Haug LLP; William S. Frommer; Thomas F. Presson

(57) ABSTRACT

A video content edition support system that includes an imaging device used to record captured video content data to a recording medium An editor's terminal unit displays video content data transmitted from the imaging device and a network connects the imaging device and the editor's terminal unit to each other. The video content edition support system further includes a recorder to describe electronic mark data related to the video content data in the video content data, an electronic mark list generator to generate electronic mark list data including header information on the video content data, and an edition unit to edit the video content data on the basis of the electronic mark list data.

13 Claims, 18 Drawing Sheets

| Key (16 BYTES) | L (16 BYTE) | Value (MAX. 32 BYTES) |

FIG.5

VIDEO CONTENT EDITING SUPPORT SYSTEM AND METHOD

CROSS-REFERENCE TO RELATED APPLICATIONS

This application claims the priority of the Japanese Patent Application No. 2002-104179 filed on Apr. 5, 2002, the entirety of which is incorporated by reference herein.

BACKGROUND OF THE INVENTION

1. Field of the Invention

The present invention relates to a video content editing support system and method for supporting the editing of video content.

2. Description of the Related Art

The TV (television) news programs and the like are edited video content data as content materials captured at a news data gathering site. The editing of video content includes off-line editing and on-line editing. The on-line editing produces final video content data (complete package) as a finished piece from video content data edited off-line for each scene.

The off-line editing is effected before the on-line editing to select necessary video scenes for the on-line editing from video scenes included in just captured video content data as material data, recording temporal positions (time codes) including an editing start position (In point) and editing end position (Out point) in a paper medium for acquiring to-be-used portions of the selected video scenes and acquiring the necessary video scenes.

After completion of the data capture, the video content data recorded in a recording medium such as a magnetic tape or the like is repeatedly replayed from the beginning of the video content data and rewound by a recorder/player (VTR: video tape recorder). With these operations, the editor selects desired video scenes, and the captured video content data are thus off-line edited.

Further, the to-be-used portions of the selected video scenes are determined based on the editing start position (In point) and editing end position (Out point). Also, the time codes are recorded in the paper medium to prepare a time codes list.

Therefore, since the recording medium having recorded therein video scenes included in video content data has to be repeatedly replayed and rewound, the selection (logging) of video scenes and extraction (logging) of to-be-used portions from the selected video scenes, namely, the off-line editing of the video scenes, cannot be done efficiently.

BRIEF SUMMARY OF THE INVENTION

Accordingly, the present invention has an object to overcome the above-mentioned drawbacks of the related art by providing a novel and improved video content editing support system and method.

It is another object to provide a video content editing support system and method in which necessary video scenes can be logged and acquired by retrieving indexes related to pre-described video scenes to make off-line editing of video content data.

The above object can be attained by providing a video content editing support system including an imaging device to record captured video content data to a recording medium, an editor's terminal unit to display video content data transmitted from the imaging device and a network to connect the imaging device and editor's terminal unit to each other, the system including according to the present invention:

a recorder to describe electronic mark data related to the video content data in the video content data;

an electronic mark list generator to generate electronic mark list data including header information on the video content data; and an editing unit to edit the video content data on the basis of the electronic mark list data.

In the above video content editing support system according to the present invention, the video content data is described whose feature has been set with respect to the video content data to generate the electronic mark list data including the header information in which the feature of at least the video content data. Thus, necessary video content data can be selected based on the header information in which the feature of the video content data included in the electronic mark list data is described to edit the video content data directly, and information on the to-be-edited video content is always collected in the electronic mark list data.

Note that the recorder to describe the electronic mark data related to the video content data in the electronic content data may be provided in either the imaging device or editor's terminal unit.

The electronic mark list generator to generate electronic mark list data including the header information on the video content data on the basis of the electronic mark data may be provided in either the imaging device or editor's terminal unit.

Further, the editing unit to edit video content data on the basis of electronic mark list data may be provided in either the imaging device or editor's terminal unit.

The recorder may be designed to describe electronic mark data in video content data captured on the real-time basis. With the recorder thus designed, electronic mark list data including header information on video content data on necessary video content data for the edit can be generated and the video content data can be edited in parallel with imaging, by describing electronic mark data in the video content data captured on the real-time basis.

The header information on the video content data may be constructed to be header information on the video scenes included in the video content data. With this data structure, header information can be described in more than one or two video scenes included in the video content data, and a feature is described in detail for each of the video scenes.

The electronic mark data may be constructed to include attribute mark data being attribute information on capturing at least video content data, and electronic mark text data in which a feature of the video content data is described. With this data structure, electronic mark data includes attribute mark data and electronic mark text data linked to each other, and since the attribute mark data is described in the video content data, information in the electronic mark data can be distributed by storing the electronic mark text data in the electronic mark data into another recording medium.

The attribute mark data may be constructed to include scene identifiers for identification of video scenes in at least video content data. With this data structure, the attribute mark data linked to the electronic mark data permits to identify more than one or two video scenes included in the video content data and thus the electronic mark text data linked to the electronic mark data related with each video scene can be distributed to another recording medium.

The electronic mark text data may be constructed to have described therein a feature, location of imaging or date of imaging of each video scene included in at least video content data with text data. With this data structure, setting, in the electronic mark text data, header information (index information) including useful text data or the like as the feature of the video content data permits to retrieve an object video content data by visually recognizing electronic mark data or taking the electronic mark text data as a keyword.

The recorder may be designed to record electronic mark data along the helical track on the recording medium. With this design, it is possible to increase the volume of information which can be described as electronic mark data.

The editing unit may be designed to generate edit information data on the basis of edited video content data. With this design, the efficiency of operations down to the on-line editing can be improved by generating, before the on-line editing, editing information data including time codes indicating editing start and end positions of to-be-used video scenes in the video content data in advance.

The electronic mark data may be constructed so that it can be generated based on an input voice. With this data structure, electronic mark data can be generated from user's voice or sound and described in video content data.

Also, the above object may be attained by providing an imaging device connected to an editor's terminal unit which displays video content data via a network and which records captured video content data to a recording medium, the device including, according to the present invention, a recorder to describe electronic mark data related to video content data in the video content data.

The above imaging device according to the present invention describes electronic mark data in which a feature of video content data is set in the video content data. With this design, electronic mark data as an index indicating the feature of the video content data and video content data can be correlated with each other.

The recorder may be designed to describe captured video content data and electronic mark data on the real-time basis. With this recording design, description of electronic mark data in real-time captured video content data permits generation of electronic mark list data including header information on necessary video content data for editing and editing the video content data in parallel with imaging.

The header information on the video content data may be constructed to be the header information on the video scenes included in the video content data. With this data structure, header information can be described in more than one or two video scenes included in the video content data, and a feature is described in detail for each of the video scenes.

Electronic mark data may be constructed to include attribute mark data being attribute information on capturing at least video content data, and electronic mark text data in which a feature of the video content data is described. With this data structure, electronic mark data includes attribute mark data and electronic mark text data linked to each other, and since the attribute mark data is described in the video content data, information in the electronic mark data can be distributed by storing the electronic mark text data in the electronic mark data into another recording medium.

The attribute mark data may be constructed to include scene identifiers for identification of video scenes in at least video content data. With this data structure, the attribute mark data linked to the electronic mark data permits to identify more than one or two video scenes included in the video content data and thus the electronic mark text data linked to the electronic mark data related with each video scene can be distributed to another recording medium.

The electronic mark text data may be constructed to describe a feature, location of imaging or date of imaging of each video scene included in at least video content data with text data. With this data structure, setting, in the electronic mark text data, header information (index information) including useful text data or the like as the feature of the video content data permits to retrieve an object video content data by visually recognizing electronic mark data or taking the electronic mark text data as a keyword.

The recorder may be designed to record electronic mark data along the helical track on the recording medium. With this design, it is possible to increase the volume of information which can be described as electronic mark data.

The electronic mark data may be constructed so that it can be generated based on an input voice. With this data structure, electronic mark data can be generated from user's voice or sound and described in video content data.

Also the above object can be attained by providing a video content editing support method in which there are used an imaging device to record captured video content data to a recording medium and an editor's terminal unit to display video content data transmitted from the imaging device connected via a network to connect the imaging device and editor's terminal unit to each other, the method including, according to the present invention, the steps of:

describing electronic mark data related to the video content data in the video content data;

generating electronic mark list data including header information on the video content data; and editing the video content data on the basis of the electronic mark list data.

The electronic mark data may be constructed so that it will be described along with the captured video content data. With this data structure, the electronic mark data is described and recorded in a recording medium in parallel to recording of the captured video content data.

The header information on the video content data may be constructed to be header information on a video scene included in the video content data.

The electronic mark data may be constructed to include attribute mark data being attribute information on capturing at least video content data, and electronic mark text data in which a feature of the video content data is described.

The attribute mark data may be constructed to include scene identifiers for identification of video scenes in at least video content data.

The electronic mark text data may be constructed to describe a feature, location of imaging or date of imaging of each video scene included in at least video content data with text data.

The electronic mark data may be designed for recording along the helical track on the recording medium.

The editing information data may be constructed so that it can be generated on the basis of edited video content data.

The electronic mark data may be constructed so that it can be generated based on an input voice.

These objects and other objects, features and advantages of the present invention will become more apparent from the following detailed description of the best mode for carrying out the present invention when taken in conjunction with the accompanying drawings.

BRIEF DESCRIPTION OF THE SEVERAL VIEWS OF THE DRAWINGS

FIG. 5 explains an example of the format of electronic mark text data coded in the video content editing support system according to the present invention.

DETAILED DESCRIPTION OF THE INVENTION

The present invention will be described in detail below concerning the embodiments thereof with reference to the accompanying drawings. It should be noted that in the following illustration and description, the components of which the functions and constructions are generally equal to each other will be indicated with the same references and any overlapping description thereof will be omitted.

Figure 1:
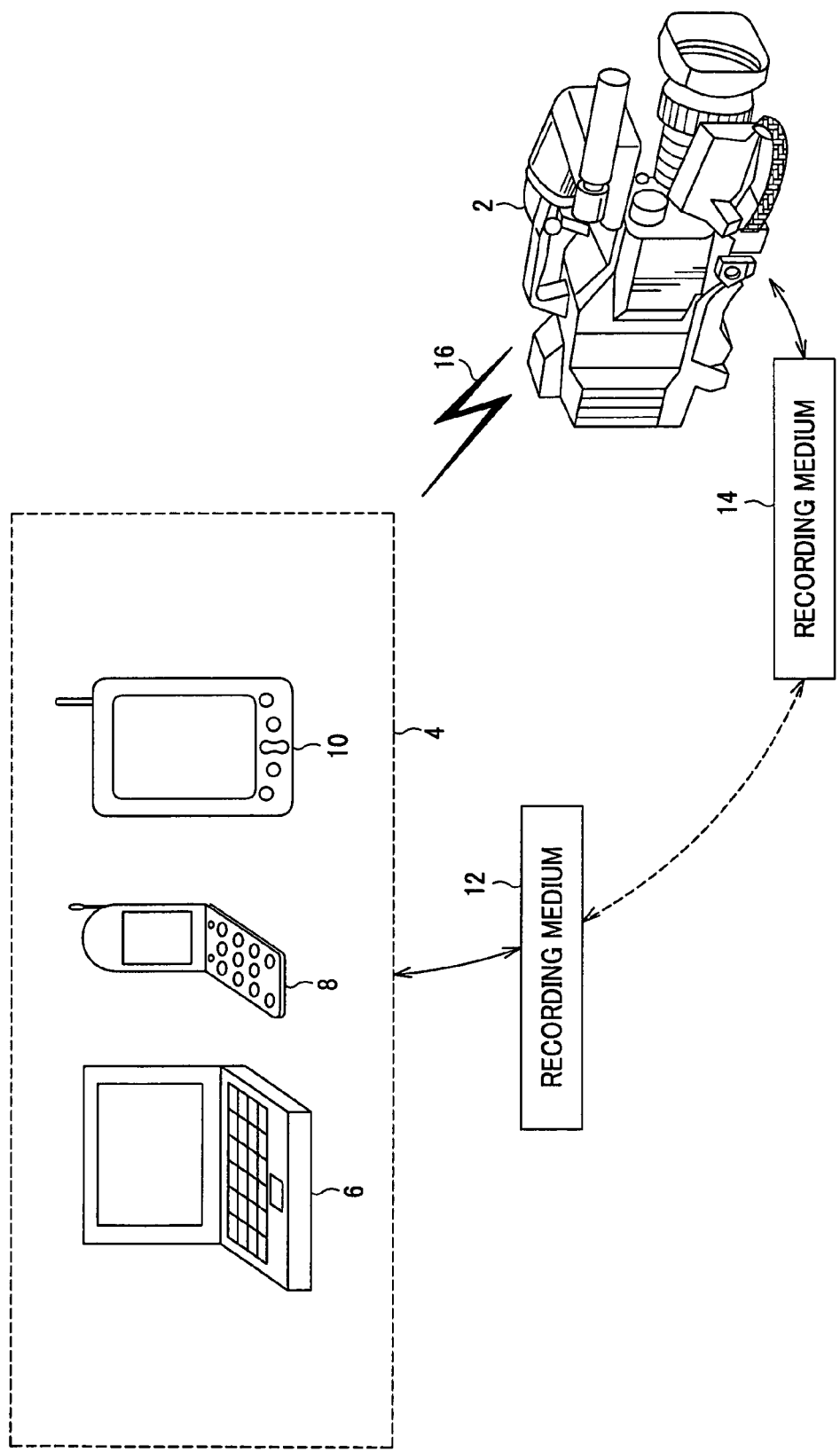
FIG. 1 is a schematic block diagram of the video content editing support system according to the present invention.
Figure 2:
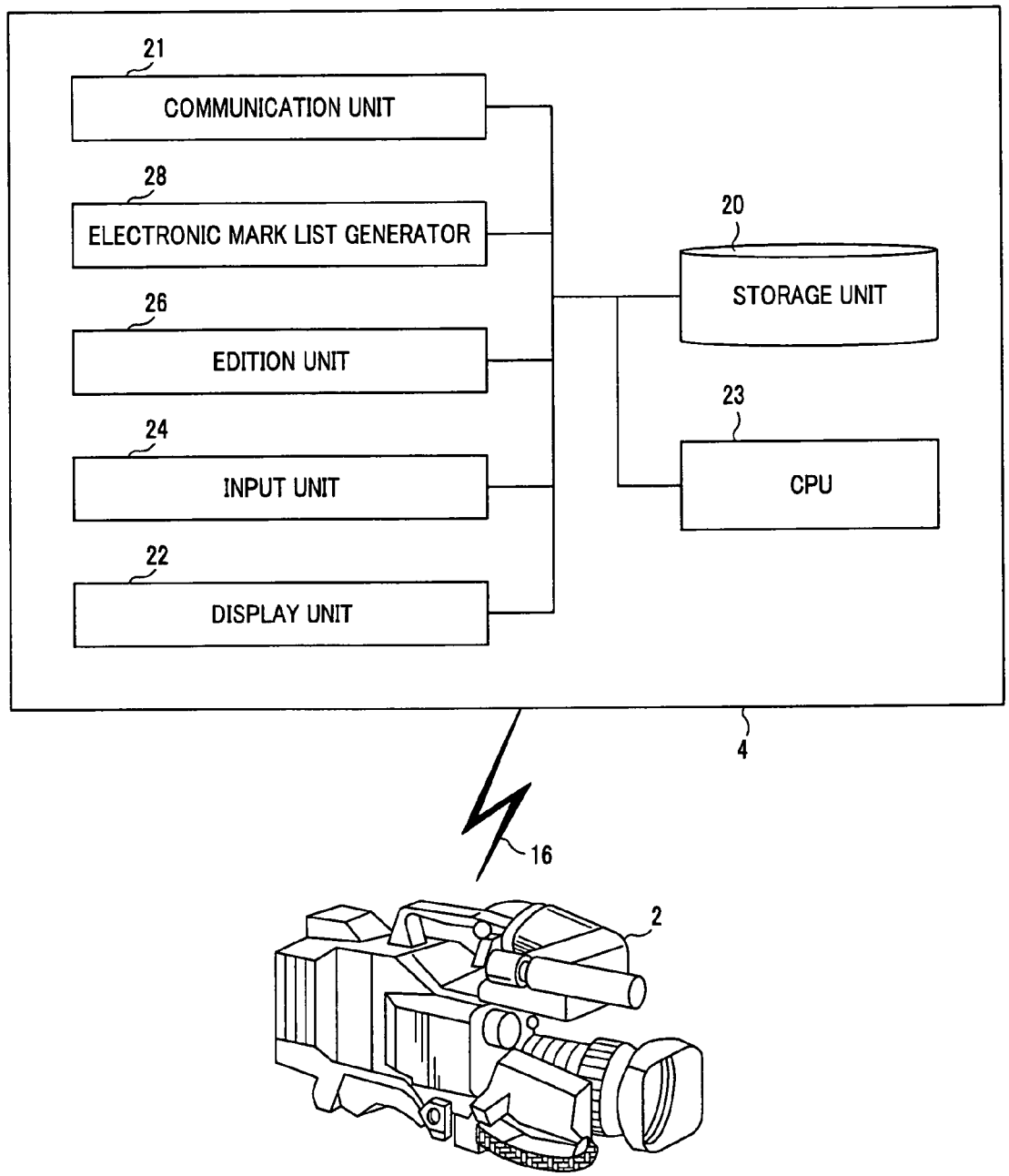
FIG. 2 is a schematic block diagram of an editor's terminal unit included in the video content editing support system according to the present invention.
Figure 3:
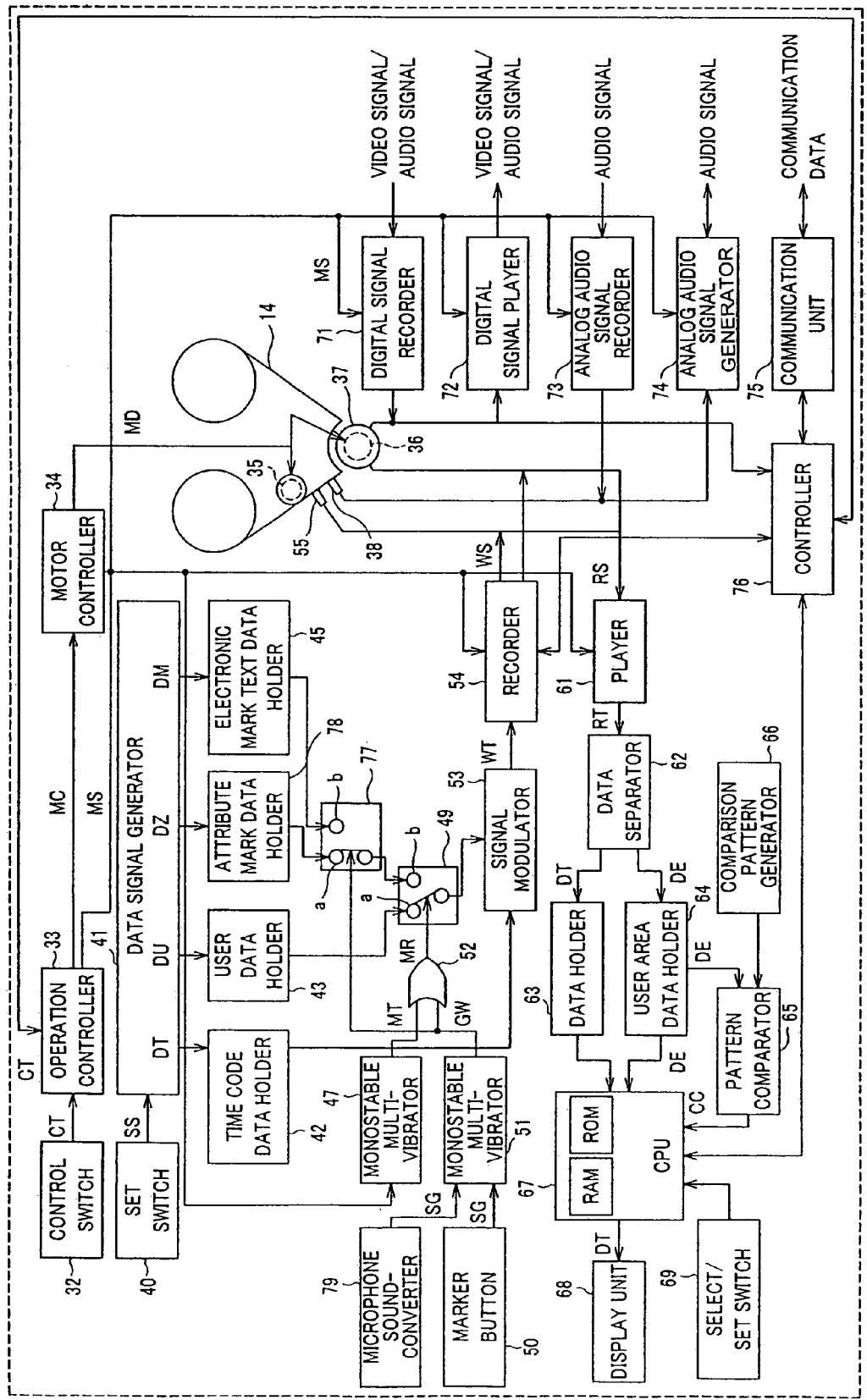
FIG. 3 is a schematic block diagram of an imaging device included in the video content editing support system according to the present invention.

Referring now to FIGS. 1, 2 and 3, there is schematically illustrated in the form of block diagrams the video content editing support system according to the present invention. FIG. 1 is a schematic block diagram of the video content editing support system according to the present invention, FIG. 2 is a schematic block diagram of an editor's terminal unit, indicated with a reference 4, included in the video content editing support system according to the present invention, and FIG. 3 is a schematic block diagram of an imaging device, indicated with a reference 2, included in the video content editing support system according to the present invention.

In the video content editing support system, the imaging device 2 such as a video camera or the like is interconnected to the editor's terminal unit 4 including any one or more of a portable computer 6, mobile phone 8 or personal digital assistants (will be referred to as "PDA" hereunder) 10 by a network 16 as shown in FIG. 1.

The imaging device 2 may not be necessarily a single unit but it may be multiple ones. In case imaging devices 2 are used, they are connected to a plurality of editor's terminal units 4 in a peer-to-peer manner via a network 16.

By providing a server (not shown) between the imaging device 2 and editor's terminal unit 4, it is possible to build a client/server network in which the imaging devices 2 and editor's terminal units 4 are handled as clients in place of the above-mentioned peer-to-peer network.

The imaging device 2 is a video camera such as a camcorder and used for recording a content such as data as a news for broadcasting, observations of a sports game or a movie.

With a recording medium 14 set in the imaging device 2 as shown in FIG. 1, the imaging device 2 can record video content data to the recording medium 14. It should be noted that the recording medium 14 used in this embodiment of the present invention is a medium such as a magnetic tape. The magnetic tape is for example a video tape of a D10-use digital VTR format type. The recording medium 14 may be an optical disk, magnetic disk or hard disk as well as the magnetic tape.

The imaging device 2 can record material data (video content data) picked up in gathering material data on, or covering, an event or the like to the recording medium 14 such as a magnetic tape, and cal also replay recorded video content data.

Video content data is still image data such as a photo, painting or the like, moving picture data such as a movie, theatrical performance or the like, audio data such as a radio program or the like, or a combination of them.

In off-line editing, video scenes (cuts) for use in on-line editing are logged from more than one or two video scenes included in video content data, an editing start position (In point) or editing end position (Out point) of a to-be-used part of the logged video scenes is set for editing of the logged video scenes, and video scenes are acquired for the on-line editing. After this off-line editing, complete package data is produced as a program to be broadcast (in the on-line editing).

Conventionally, the recording medium 14 having video content data (material data to be recorded) recorded therein is replayed from the beginning of the video content, and an editing position being an In point or Out point of a video scene which will be used is manually determined based on time codes recorded in the recording medium 14 and the complete package data are recorded in a paper medium or the like. It should be noted that the time codes will be described in detail later.

The editor's terminal unit 4 receives video content data captured by the imaging device 2 via the network 16 at any time on the real-time basis, and displays the captured video content data on a display unit or the like. Therefore, a content captured by a photographer can be checked from the same point of view as that of the photographer in a place apart from the imaging device 2. It should be noted that the editor's terminal unit 4 can also receive all recorded video content data collectively.

The network 16 is a radio channel as defined in the standard IEEE (Institute of Electrical and Electronics Engineers, Inc.) 802.11a etc. or an RS-232C (recommended standard 232C) cable. Also, it may be a radio channel by a satellite communication or a cable such as an optical fiber.

Next, the electronic mark data included in the present invention will be described.

The electronic mark data is described (recorded) in video content data such as video or audio data and associated with the video content data (that is, metadata).

The electronic content data is transmitted by SDI (serial digital interface) on the basis of the SMPTE (Society of Motion Picture and Television Engineers).

The electronic content data includes attribute mark data and electronic mark text data. The attribute mark data includes a recording medium identifier for identification of the recording medium 14, video scene identifier for identification of more than one or two video scenes included in video content data, etc.

The attribute mark data identifies a video scene in video content data with the use of UMID (unique material identifier). It should be noted that UMID will be described in detail later.

The electronic mark text data represents, by text data, a location of imaging, identified by GPS (global positioning system) or the like, a magnification of a camera included in the imaging device, feature of a video scene, date of imaging, etc. Electronic mark data can be visually recognized based on header information formed from the text data or object video content data can be retrieved with the electronic mark text data being taken as an indexing keyword.

By indexing the electronic mark data described in the video content data in the off-line editing, it is possible to select a video scene including object video data or audio data. Thus, video scenes necessary for the on-line editing can efficiently be selected in advance without having to repeatedly replay the video content data by a recorder/player (VTR).

Figure 5:
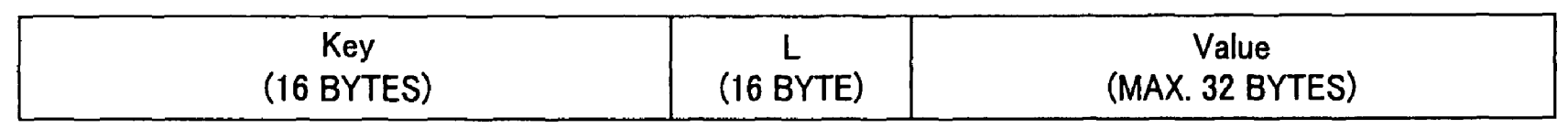

Next, the electronic mark text data will be explained with reference to FIG. 5. FIG. 5 explains a format of electronic mark text data included in the present invention and coded with KLV (key length value).

The electronic mark text data is text data having described therein the feature or essence of a video scene. It is metadata associated (linked) with the aforementioned attribute mark data. For example, the features of a video scene such as "highlight", "OK", "NG" and the like and information including a location of imaging such as "Tokyo" or "Japan" are described by text data in the electronic mark text data.

As shown in FIG. 5, when electronic mark text data is to be transmitted via the network, it has to be KLV-coded. The KLV-coded electronic mark text data includes a maximum of 49 bytes. The format of the KLV-coded electronic mark text data is in compliance with the SMPTE 335M/RP210A (metadata dictionary).

The KLV-coded electronic mark text data includes a "Key" part of 16 bytes, "L (length)" part of 1 byte and a "Value" part of 32 bytes at maximum.

The "Key" part is an identifier to indicate a KLV-coded data item complying with SMPTE 335M/RP210A (metadata dictionary). It is an identifier to identify the electronic mark text data. Various values the identifier takes for various data items are defined in the metadata dictionary in SMPTE.

Further, an item named "Cataloguing, Indexing, Thesaurus or Gezertter system used" is defined in the SMPTE metadata dictionary as a one corresponding to the coding of the electronic mark text data included in the present invention.

In case the electronic mark text data is described by a 7-bit coded character set defined in ISO (International Organization for Standardization), the defined concrete values the identifier takes are represented in hexadecimal notation as 06(h) 0E (h) 2B(h) 34(h) 01(h) 01(h) 01(h) 01(h) 03(h) 02(h) 01(h) 02(h) 02(h) 00(h) 00(h) 00(h).

In case the electronic mark text data is described by UTF-16 (unicode), the concrete values the identifier takes are represented in hexadecimal notation as 06(h) 0E(h) 2B(h) 34(h) 01(h) 01(h) 01(h) 01(h) 03(h) 02(h) 01(h) 02(h) 02(h) 01(h) 00(h) 00(h).

The "L" indicates the length of data following the "L" part in bytes. In case the ISO 7-bit coded set is used in coding electronic mark text data, the maximum data length is 32 bytes (20(h)). In case UTF-16 (16-bit UCS Transformation Format) is used, the data length is limitless. It should be noted that USC (Universal Multiple-Octet Coded Character set) is a coded character set prepared by ISO and IEC (International Electrotechnical Commission) in cooperation with each other similarly to the ISO 7-bit coded character set.

The "Value" part is a field including text data where electronic mark text data is stored. In case UTF-16 is used, one character is represented by 2 bytes.

The KLV-coded electronic mark text data is transmitted by the method defined in the SMPTE standard. For example, in case the data is transmitted by SDI (serial digital interface), the KLV-coded electronic mark text data is stored into a V-ancillary area of video data.

Figure 4:
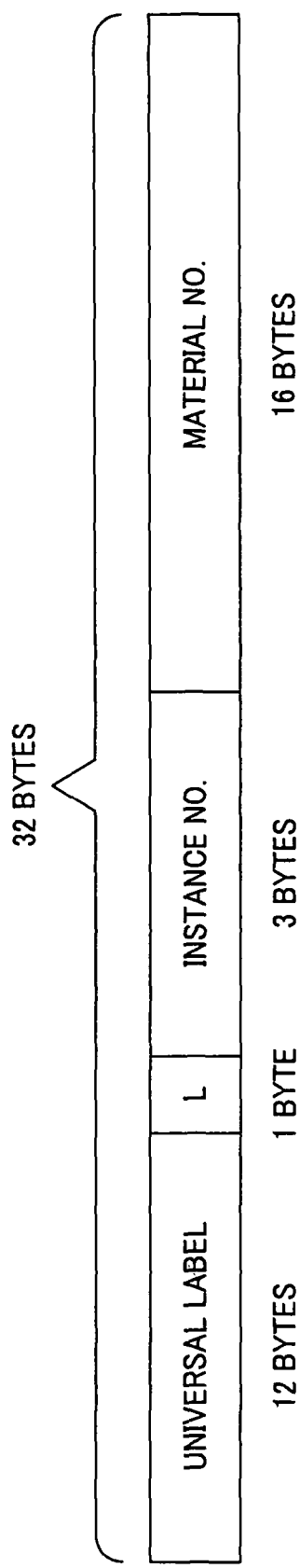
FIG. 4 explains an example of the format of UMID data coded in the video content editing support system according to the present invention.

Next, the UMID data will be explained with reference to FIG. 4. FIG. 4 explains an example of the format of the UMID data coded in the video content editing support system according to the present invention. Similarly to the electronic mark text data, the UMID data has to be KLV-coded in case it is transmitted by SDI via the network.

The UMID data is a video content data (recorded material data) identifier standardized by SMPTE. Like the electronic mark text data, the UMID data has to be KLV-coded for transmission by SDI or the like via the network.

As shown in FIG. 4, the KLV-coded UMID data is of 32 bytes in a format including a "Universal label" part, "L" part to indicate the data length of the remainder of the UMID data, an "Instance No." part, and a "Material No." part.

The "Universal label" is a unique identifier to identify data as SMPTE-defined one. It defines the type of a material to be identified on the basis of the UMID data.

The data length indicates those of the "Instance No." and "Material No.", and the UMID data has a unique value "13 (h)" in hexadecimal notation.

The "Instance No." part is a field of 3 bytes for definition of a difference between material instances. For example, when the UMID data is original material data, the "Instance No."

will be "00(h) 00(h) 00(h)". It should be noted that the "Instance No." is defined with the SMPTE-defined UMID data.

The "Material No." part is a field of 16 bytes for identification of a video scene formed from video content data. Therefore, with the "Material No." for the UMID data, it is possible to identify a video scene formed from video content data recorded in a recording medium.

Therefore, since the "Material No." in the UMID data identifies a video scene, an object video frame can be acquired from video content data on the basis of "Material No." in the UMID data.

As shown in FIG. 4, the UMID data is KLV-coded. The KLV coding is a data encoding protocol defined SMPTE Standard 336M for Television.

The KLV-coded UMID data is transmitted to an external unit via the network by an SMPTE-defined method.

Next, the components of the video content editing support system according to the present invention will be explained with reference to FIGS. 1, 2 and 3.

The network 16 connects the imaging device 2 and editor's terminal unit 4 for two-way communications between them. According to the present invention, it is a radio communication network as defined in the IEEE 802.11a Standard. However, the network 16 may be a one capable of radio or cable communication including cable communication by RS-232C, satellite communication or an optical communication using optical fibers.

The editor's terminal unit 4 is an information processing unit including at least a central processing unit (CPU), communication unit and a storage unit. It is generally a computer device. As shown in FIG. 1, the editor's terminal unit 4 may be a lap-top portable computer 6, mobile phone 8 or a PDA (personal digital (data) assistants) 10, for example.

The editor's terminal unit 4 can record video content data and electronic mark data real-time transmitted from the imaging device 2. Also, it can be connected to the imaging device 2 via the network 16 and can edit data from the imaging device 2, such as changing or addition of electronic mark data and also such as editing video content data.

As shown in FIG. 2, the editor's terminal unit 4 includes a CPU (central processing unit) 23 capable of computing, a communication unit 21 for making data communications with the imaging device 2 via the network 16, a display unit 22 to display video content data or the like, an input unit 24, an electronic mark list generator 28 to generate electronic mark list data on the basis of electronic mark data, an editing unit 26 to edit electronic mark data or video content data, and a storage unit 20 using a recording medium (not shown) to store video content data etc.

The communication unit 21 sends and receives video content data or electronic mark data via the network 16. It has also a video capture function to receive video content data and display an image on the display unit 22.

The input unit 24 includes buttons, levers, keyboard or the like. In case the input unit has a keyboard, the editor or user can generate text data such as characters or the like by the keyboard. Also, it can be provided with an audio input terminal or the like (not shown) which can be supplied with sounds from an external microphone, and convert the sounds into text data.

Next, the imaging device 2 will be explained in detail with reference to FIG. 3. FIG. 3 is a schematic block diagram of the imaging device 2 included in the video content editing support system according to one embodiment of the present invention.

The imaging device 2 has a function to capture an object, record the captured video content data into the recording medium 14 and replay the video content data recorded in the recording medium 14. It is a camcorder as an integrated combination of a camera and VTR (video tape recorder).

As shown in FIG. 3, the imaging device 2 includes a recorder/player unit for video and audio data, a communication unit 75 to make data communications with an external unit such as the editor's terminal unit 4, a controller 76, a mark setting block for describing electronic mark data, and a mark acquiring block to acquire electronic mark data.

The controller 76 has a data storing function, and is connected to the stationary head 55, rotary head unit 37, CPU 67, recorder 54 and communication unit 75 to control data or signals to be sent and received.

The above recorder/player block includes a digital signal recorder 71, digital signal player 72, analog audio signal recorder 73, analog audio signal generator 74, stationary heads 55 and 38 for recording/playing a time code, capstan motor 35, drum motor 36, rotary head assembly 37 to write/read video and audio data, and a motor controller 34.

The recorder/player block converts video content data including video or audio data picked up from an object into video or audio signal, and records or reads the video and audio signal as video or audio data. Electronic mark data generated by the mark setting block is described in place in video content data in the recording medium 14.

Further, the imaging device 2 includes a control switch 32 to set an operation mode and the like in which it switches on the imaging device 2 for recording or playing. The control switch 32 is connected to an operation controller 33. The operation controller 33 generates motor control signal MC and mode signal MS on the basis of an operation mode signal CT set by the control switch 32 or on the basis of an operation mode signal CT supplied from the communication unit 75.

The motor control signal MC is transmitted to the motor controller 34, and the mode signal MS is transmitted to the recorder 54, player 61, digital signal recorder 71, digital signal player 72, analog audio signal recorder 73, analog audio signal generator 74 and also to a monostable multivibrator 47.

The motor controller 34 generates a motor drive signal MD on the basis of the supplied motor control signal MC. Upon arrival of the motor control signal MD at the capstan motor 35 and drum motor 36, a magnetic tape as the recording medium 14 is fed and the rotary head assembly 37 with a plurality of heads is rotated.

As being rotated, the rotary head assembly 37 describes electronic mark data in video content data, and records the video content data having the electronic mark data thus described therein to the recording medium 14.

The mark setting block includes a set switch 40, data signal generator 41, time code data holder 42, user data holder 43, electronic mark text data holder 45, attribute mark data holder 78, monostable multivibrators 51 and 47, signal select switches 19 and 77, marker button 50, signal modulator 53, recorder 54 and a microphone sound-converter 79.

The mark setting block generates electronic mark text data and attribute mark data in response to time code data synchronous with a frame of video content data recorded in the recording medium 14 and an input from the marker button 50 or microphone sound-converter 79. It should be noted that the time code data will be described in detail later.

The set switch 40 sets whether a time of imaging, patterns (types) of electronic mark text and attribute mark included in electronic mark data, GPS information as results of measurement of position, orientation and altitude of a location of imaging, etc. are to be recorded or not, and transmits a set signal SS to the data signal generator 41 as a means for generating a pattern.

The data generator 41 generates time code data DT, user data DU, electronic mark text data DM and attribute mark data DZ on the basis of the set signal SS supplied from the set switch 40. The time code data DT thus generated is held in the time code data holder 42 while being transmitted to the signal modulator 53. Also, the user data DU is held in the user data holder 43 while being transmitted to a terminal a of the signal select switch 49. The electronic mark text data DM is held in the electronic mark text data holder 45 while being transmitted to a terminal b of the signal select switch 77. The attribute mark data DZ is held in the attribute mark data holder 78 while being transmitted to the terminal a of the signal select switch 77.

The marker button 50 is to be used (pressed) for describing (recording) electronic mark text data included in the electronic mark data. The marker button 50 is composed of more than one or two buttons.

There will be explained below capturing and recording of a video material in case the marker button 50 is composed of a plurality of buttons, for example. When one of the buttons is pressed for a "highlight" scene, text data and a "highlight" mark for "highlight" electronic mark text data are described in the recording medium 14 or the like.

If an "In" button is included in the plurality of buttons and when it is pressed, an "In" mark for electronic mark text data in which text data is "In" will be described as above. Also if an "Out" button is included and when it is pressed, an "Out" mark for electronic mark text data in which text data is "Out" will be described. The type of the marker button 50 can be varied at any time depending upon an object to be captured and purpose of material data gathering.

The microphone sound-converter 79 is used, like the marker button 50, to record electronic mark text data and attribute mark data included in electronic mark data. A sound supplied to the microphone sound-converter 79 will be recognized by the latter and converted into text data. The text data is described as electronic mark text data or attribute mark data by the rotary head assembly 37 into video content data, and then recorded to the recording medium 14. For example, a voice "highlight" supplied to the microphone sound-converter 79 will be recognized as a "highlight" mark for electronic mark text data, and "highlight" electronic mark text data will be described in the recording medium 14.

The marker button 50 and microphone sound-converter 79 are input devices which are operated to describe the electronic mark text data and attributed mark data included in the electronic mark data in the video content data as above. When either the marker button 50 or microphone sound-converter 79 is operated and a control signal SG is transmitted to the monostable multivibrator 51, a mark signal GW whose level is high "H" for a predetermined length of time is transmitted from the monostable multivibrator 51 to the signal select switch 77 and an OR circuit 52. The signal select switch 77 has the moving terminal thereof controlled with the mark signal GW.

In the monostable multivibrator 47, when the mode of operation is shifted to recording on the basis of the mode signal MS, there is generated a mode timing signal MT whose level is high "H" for a predetermined length of time. The mode timing signal MT is transmitted to the OR circuit 52.

The OR circuit 52 transmits a signal MR to the signal select switch 49 which will thus have the moving terminal thereof controlled with the signal MR.

In the signal modulator 53, the time code data DT supplied from the time code data holder 42 is automatically updated. The updated time code data DT is modulated along with data selected by the signal select switch 49 to provide a recording data signal WT. The recording data signal WT is transmitted to the recorder 54.

The recorder 54 converts the supplied recording data signal WT into a recording data signal WS and transmits the recording data signal WS to the stationary head 55 and rotary head assembly 37 on the basis of the mode signal MS supplied from the operation controller 33.

The rotary head assembly 37 describes attribute mark data and electronic mark text data included in electronic mark data into video content data, and records the video content data having the attribute mark data and electronic mark text data described therein to a helical track 82 on the recording medium 14.

The stationary head 55 describes the time code data into the video content data, and records the video content data having the time code data described therein to a time code track TC on the recording medium 14.

The mark acquiring block includes the player 61, data separator 62, data holder 63, user area data holder 64, comparison pattern generator 66, pattern comparator 65, CPU 67, display unit 68 and a select/set switch 69.

The mark acquiring block acquires electronic mark text data or attribute mark data recorded in video content data by replaying the recording medium 14.

The player 61 is connected to the stationary head 55 and rotary head assembly 37 which read a signal for reading video data or audio data acquired from the video content data. It converts a read signal RS from the stationary head 55 into a read video content data signal RT and transmits the data signal RT to the data separator 62.

The data separator 62 separates the read video content data signal RT into video content data DT and user data DE stored in an AUX signal field 83 on a helical track 82. It should be noted that the helical track 82 and AUX signal field 83 will be described in detail later.

The separated video content data DT is transmitted to the data holder 63 where it will be held until a next video content data is transmitted. Also, the held video content data DT is transmitted to the CPU 67.

The user data DE is held in the user area data holder 64. The user data DE held in the user area data holder 64 is transmitted to the pattern comparator 65 and CPU 67.

The display unit 68 includes a liquid crystal display or the like, and displays the electronic mark text data and attribute mark data included in electronic mark data, time code data, video content data, etc.

The pattern comparator 65 is connected to the comparison pattern generator 66. It makes a comparison between attribute mark data DZ or electronic mark data DM generated by the comparison pattern generator 66 and the user data DE supplied from the user area data holder 64, and transmits a comparison signal CC as the result of comparison to the CPU 67.

The CPU 67 judges, based on the comparison signal CC supplied from the pattern comparator 65, whether the attribute mark data DZ and user data DE are coincident with each other or whether the electronic mark data DM and user data DE are coincident with each other. When the result of judgment is affirmative, the CPU 67 will store the attribute mark data DZ or electronic mark text data DM into RAM while transmitting the data to the display unit 68 and controller 76.

A video scene of video content data can be cued up correspondingly to the attribute mark data DZ or electronic mark data DM thus simply designated.

Note that the digital signal recorder 71 converts digital video and audio signals into a recording signal. Also, this recording signal is transmitted to the rotary head assembly 37 on the basis of a mode signal MS supplied from the operation controller 33. The rotary head unit 37 records a signal of video content data to the recording medium 14 which is a magnetic tape.

Further, the digital signal recorder 71 transmits the recording signal to the controller 76 in order to send captured video content data to the editor's terminal unit 4. The transmitted recording signal is converted for display at the editor's terminal unit 4 before it is sent from the communication unit 75 to the editor's terminal unit 4.

A read signal generated by the rotary head assembly 37 which plays back the recording medium 14 is transmitted to the digital signal player 72 where it will be converted into video content data of digital video and audio signals and transmitted to the player 61 and controller 76.

The analog audio signal recorder 73 converts an analog audio signal into a recording signal. The recording signal is transmitted and recorded to the stationary head 38 or controller 76 on the basis of a mode signal MS supplied from the operation controller 33. The recording signal from the recording medium 14 or controller 76 is transmitted to the analog audio signal player 74 where it will be converted into an analog audio signal.

Figure 6:
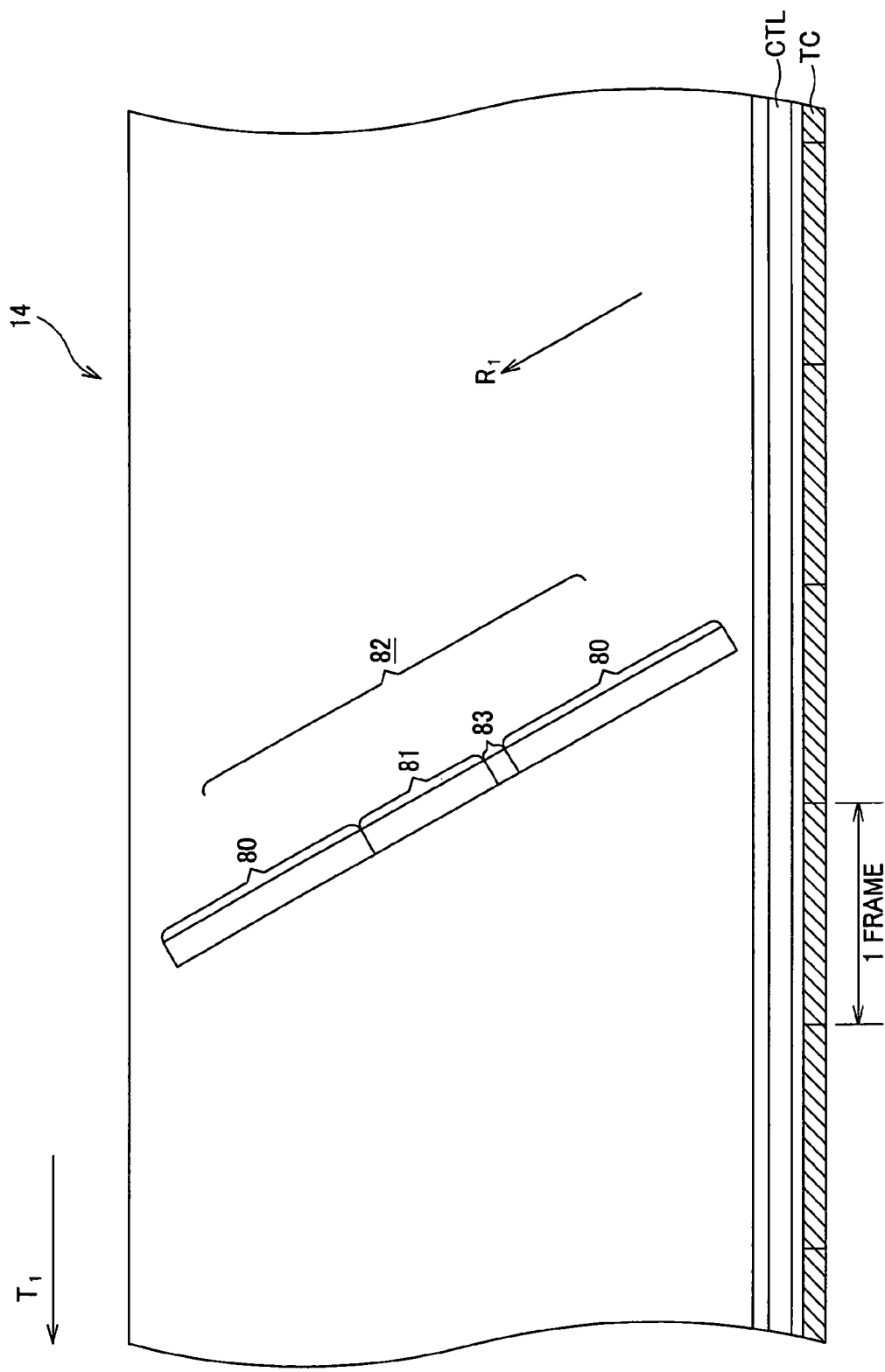
FIG. 6 schematically illustrates the construction of a recording medium used in the video content editing support system according to the present invention.

First, the recording medium 14 to which electronic mark data and video content data are to be recorded will be explained with reference to FIG. 6. FIG. 6 schematically illustrates the construction of the recording medium 14 used in the video content editing support system according to the present invention.

As shown in FIG. 6, the recording medium 14 includes the helical track 82 formed on a magnetic tape by a helical scan in a direction $R_1$ in which the rotary head assembly 37 travels, a control track CTL formed longitudinally of the tape, and a time code track TC being a time base synchronous with video content data. It should be noted that "T" in FIG. 6 indicates a direction $T_1$ in which the magnetic medium travels.

The helical track 82 is so standardized by SMPTE that one frame of video data is recorded to a set of 10 or 12 helical tracks, for example.

The helical track 82 includes a video signal field 80 recorded as video data, an audio signal field 81 recorded as audio data, and the AUX (auxiliary) signal field 83.

Figure 8:
FIG. 8 schematically illustrates the structure of an AUX signal field of the helical track on the recording medium used in the video content editing support system according to the present invention.

The AUX signal field 83 includes a "Header" part, "System" part of 5 bytes, "User data" part of 104 bytes, "Reserve" part of 35 bytes, and a "Parity" part of 12 bytes as shown in FIG. 8.

Figure 9:
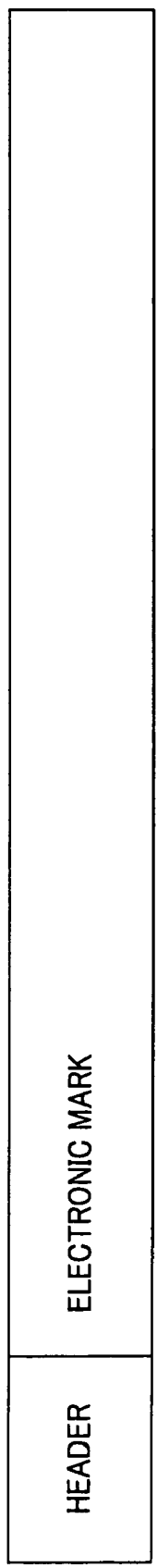
FIG. 9 schematically illustrates the structure of a user data part of the AUX signal field on the helical track on the recording medium used in the video content editing support system according to the present invention.

Further, the "User data" part of 104 bytes includes a "Header" part and "Electronic mark" part as shown in FIG. 9. Electronic mark data including attribute mark data and electronic mark text data in this embodiment is recorded in the "Electronic mark" part. It should be noted that video and audio data may be recorded in an analog form. Also, video and audio data may be compressed on the basis of the MPEG-2 Standard (Moving Pictures Expert Group-2 Standard), for example.

Figure 7:
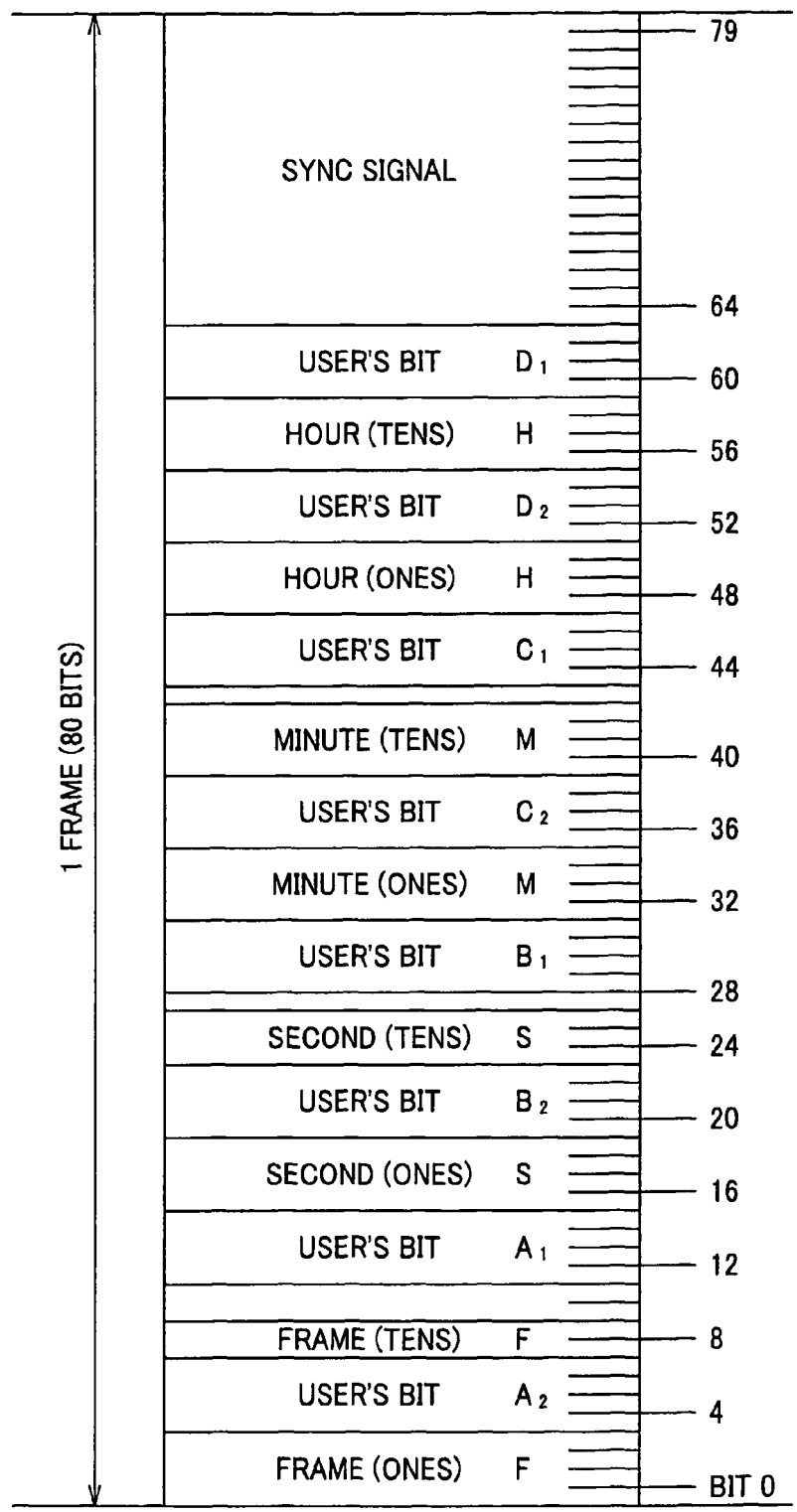
FIG. 7 explains an example of the format of a time code recorded on the time code track on the recording medium used in the video content editing support system according to the present invention.

Time code data to be recorded to the time code track TC includes 80-bit frame areas each as one unit as shown in FIG. 7. Each frame area includes a synchronous signal area for recording a sync signal, eight time code recording bit areas for recording a time code (HH:MM:SS:FF) representing a hour (HH), minute (MM), second (SS) and frame (FF), and eight user's bit recording areas for recording user's bits (D1D2:C1C2:B1B2:A1A2).

As shown in FIG. 7, hours (HH) information in the time code is recorded in two bit areas (HH) represented by bits 48 to 51 and bits 56 to 59, minutes (MM) information is recorded in two bit areas represented by bits 32 to 35 and bits 40 to 42, seconds (SS) information is recorded in two bit areas represented by bits 16 to 19 and bits 24 to 26, and frame (FF) information is recorded in two bit areas represented by bits 0 to 3 and bits 8 and 9.

Figure 10:
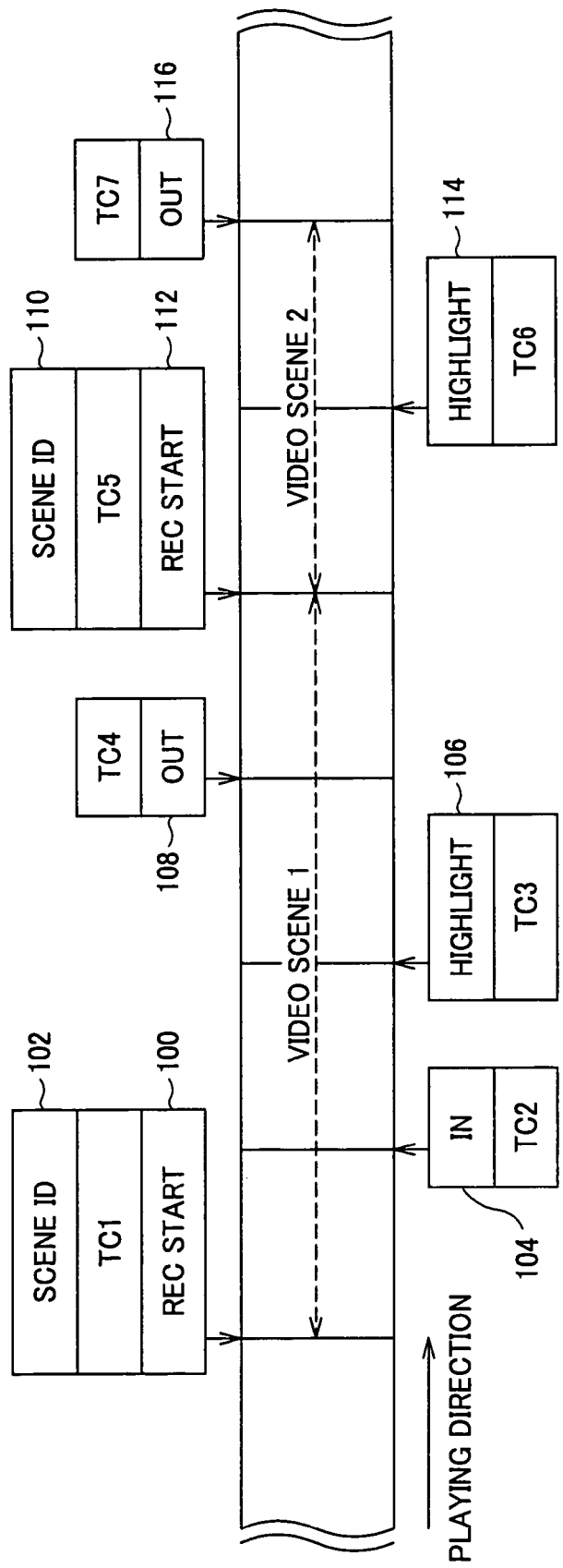
FIG. 10 schematically illustrates the construction of a recording medium having described therein electronic mark data in the video content editing support system according to the present invention.

The recording medium 14 having electronic mark data marked (recorded) therein will be explained herebelow with reference to FIG. 10. FIG. 10 schematically illustrates the construction of the recording medium 14 having described therein electronic mark.

The marker button 50 or microphone sound-converter 79 included in the imaging device 2 records, to the recording medium 14 or the like, electronic mark text data as an index used to retrieve a desired video scene included in the video content data for off-line editing.

In the course of imaging, the imaging device 2 marks electronic mark data directly to a video scene in the recording medium 14 for use in on-line editing as shown in FIG. 10.

First, when the imaging device 2 starts taking "Video scene 1", there will be recorded in the "Electronic mark" part of the "User data" part in the AUX signal field 83 on the recording medium 14 "REC start" 100 indicating the start of recording, "Scene ID" 102 for identification of the "Video scene 1", "IN" 104 indicating an In point, "Highlight" 106 indicating a highlight of the scene and "OUT" 108 indicating an Out point in this order in the playing direction, as shown in FIG. 10.

Synchronously with the description of the electronic mark data, "TC1", "TC2", "TC4" and time code data are recorded to the time code track TC on the recording medium 14.

Note that the scene identifier generically refers to a unique number, symbol or the line for identification of a video scene included in video content data, for example, "Scene ID".

Also, when the imaging device 2 starts taking a "Video scene 2", there will be recorded in place "Scene ID" 110 for identification of the "Video scene 2", "REC start" 112 indicating the start of recording, "OUT" 116 indicating an Out point (editing end point) or "Highlight" 114 indicating a highlight of the scene and their respective electronic mark data, as shown in FIG. 10.

Further, with the "Video scene 2", time code data "TC5", "TC6" and "TC7" are recorded to the recording medium 14 synchronously with the description of the electronic mark data.

As shown in FIG. 10, text data registered in the electronic mark text data such as "REC start" 100, "IN" 104, etc. may be pre-registered correspondingly to the imaging situations and the described text data be changed. For example, electronic mark text data for "home run" indicating a video scene of a home run in a baseball game can be registered or other electronic mark text data can be changed to "home run".

Figure 11:
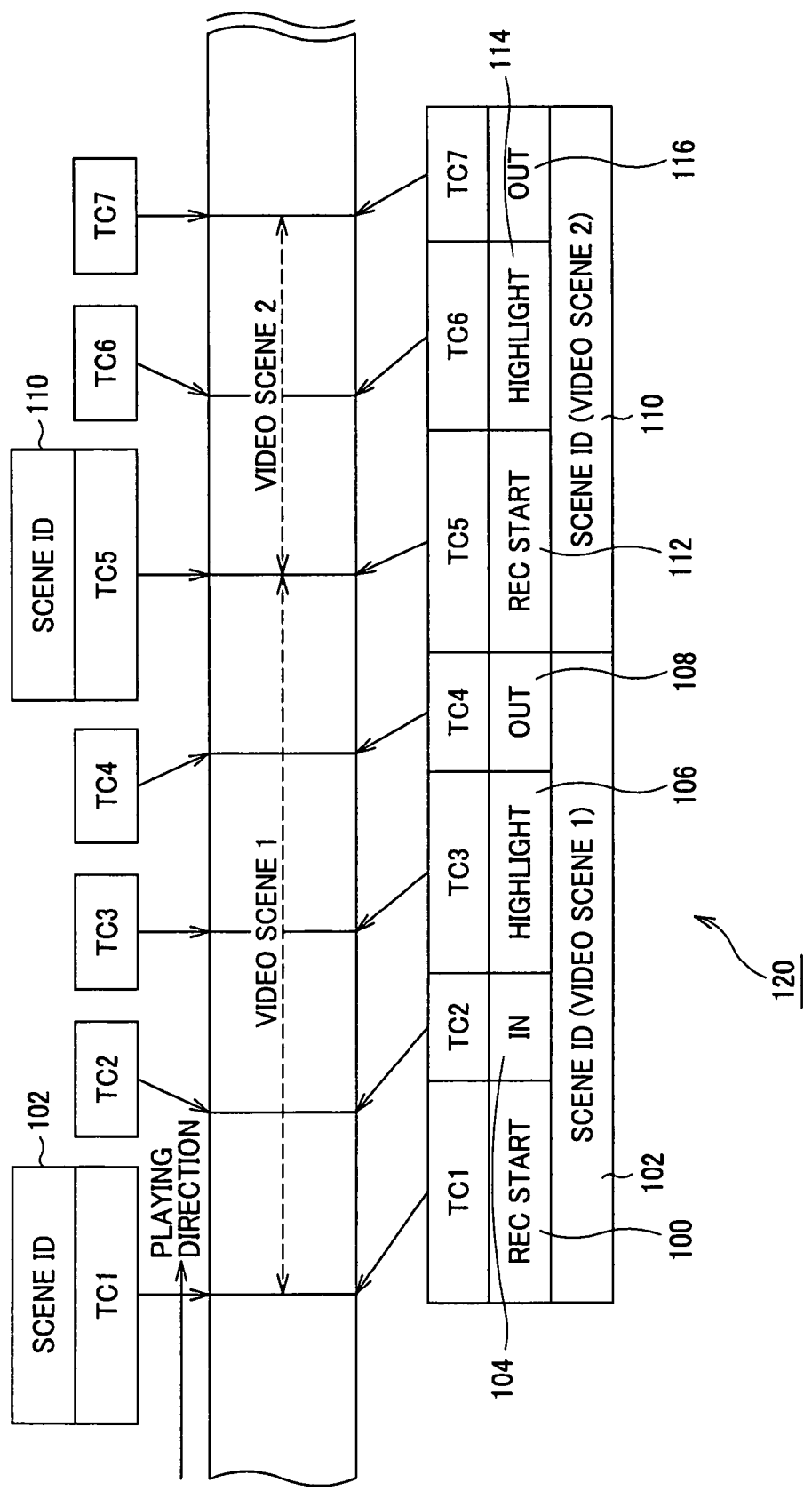
FIG. 11 schematically illustrates the construction of the recording medium having described therein electronic mark data in the video content editing support system according to the present invention.

Also, electronic mark data can be recorded to the recording medium 14 while being recorded to another recording medium such as the storage unit 20 in the editor's terminal unit 4, for example, as shown in FIG. 11. FIG. 11 explains how electronic mark data is described in the storage unit 20 and recording medium 14, respectively, according to this embodiment.

As shown in FIG. 11, after imaging is started, the time code data "TC1", "TC2", . . . , "TC7" will be recorded to the recording medium 14 into the "Video scene 1" and "Video scene 2" already therein in the playing direction synchronously with the "Scene ID" 102 and "Scene ID" 110 for identification of the "Video scene 1" and "Video scene 2", respectively, in attribute mark data and with video content data. It should be noted that the electronic mark text data will not be described in the recording medium 14.

As shown in FIG. 11, after starting imaging, the storage unit 20 will store an electronic mark data list 120 including "Scene ID" 101 and "Scene ID" 110 as attribute mark data, "REC start" 100, "Highlight" 106, "OUT" 108, "REC start" 100, "IN" 104, "Highlight"106 and "OUT" 116 as electronic mark text data, and the time code data "TC1", "TC2", "TC7" described synchronously with the recording medium 14 according to the description of the electronic mark data in the recording medium 14. It should be noted that the electronic mark data list 120 generically refers to list data generated on the basis of electronic mark data such as electronic mark list data etc. which will be described in detail later.

As shown in FIG. 11, the storage unit 20 stores electronic mark text data including "REC start" etc., attribute mark data including "Scene ID" etc. and time code "TC" grouped with respect to each video scene.

A video scene for entry into the electronic mark data list 120 can be retrieved taking, as indexes, electronic mark data including attributed mark data and electronic mark text data recorded in the electronic mark data list 120, and time code data synchronous with the electronic mark data, and also a video scene recorded in the recording medium 14 can be retrieved directly from the time code data and attribute mark data recorded in the recording medium 14.

Figure 12:
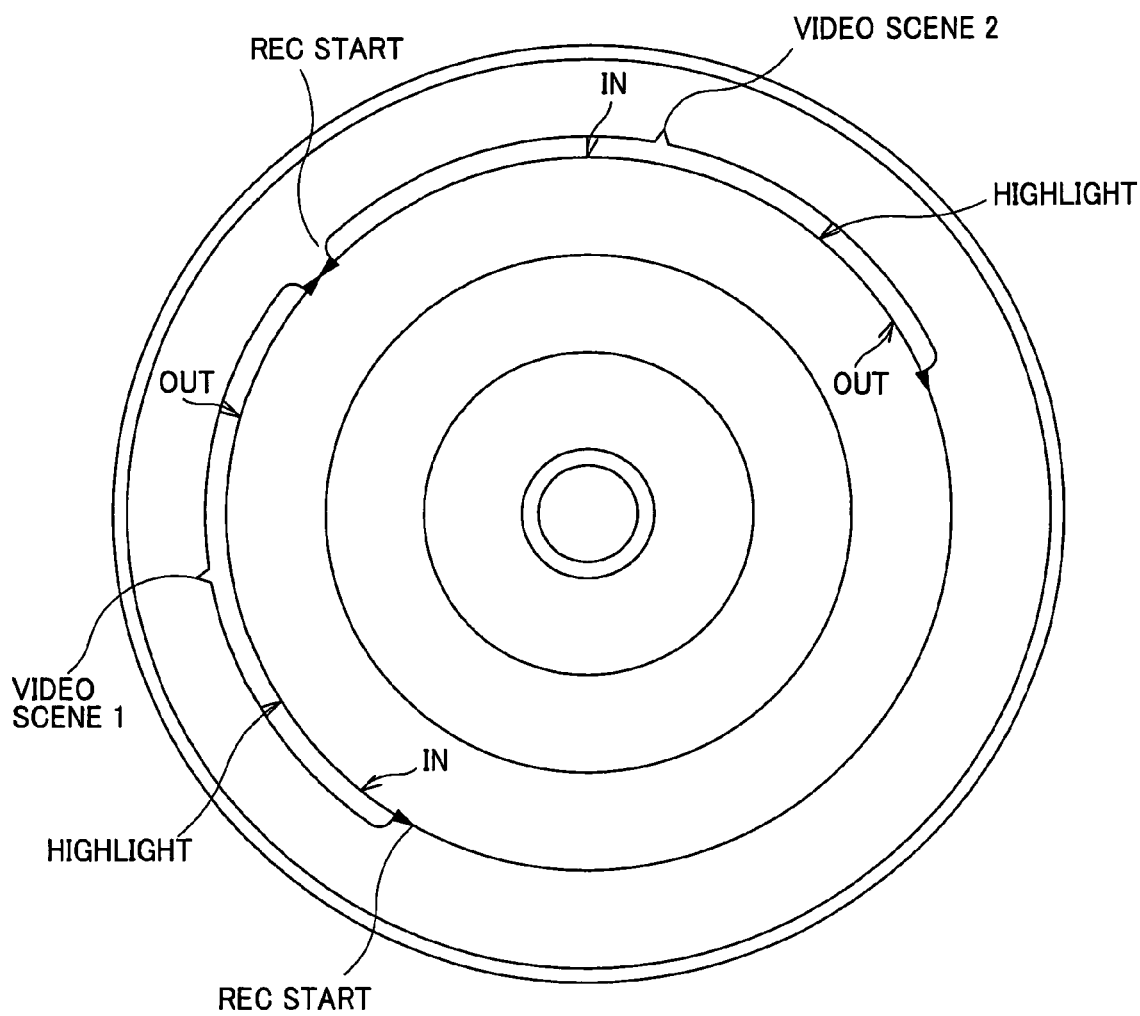
FIG. 12 schematically illustrates the construction of an optical disk having described therein electronic mark data in the video content editing support system according to the present invention.

Note that the recording medium 14 is not limited to any magnetic tape but may be an optical disk, magnetic disk or hard disk. For example, an optical disk drive having a similar function as in FIG. 3 may be used to record electronic mark data and other data to an optical disk as shown in FIG. 12.

The embodiment of the video content editing support system constructed as above operates as will be described hereebelow.

Figure 13:
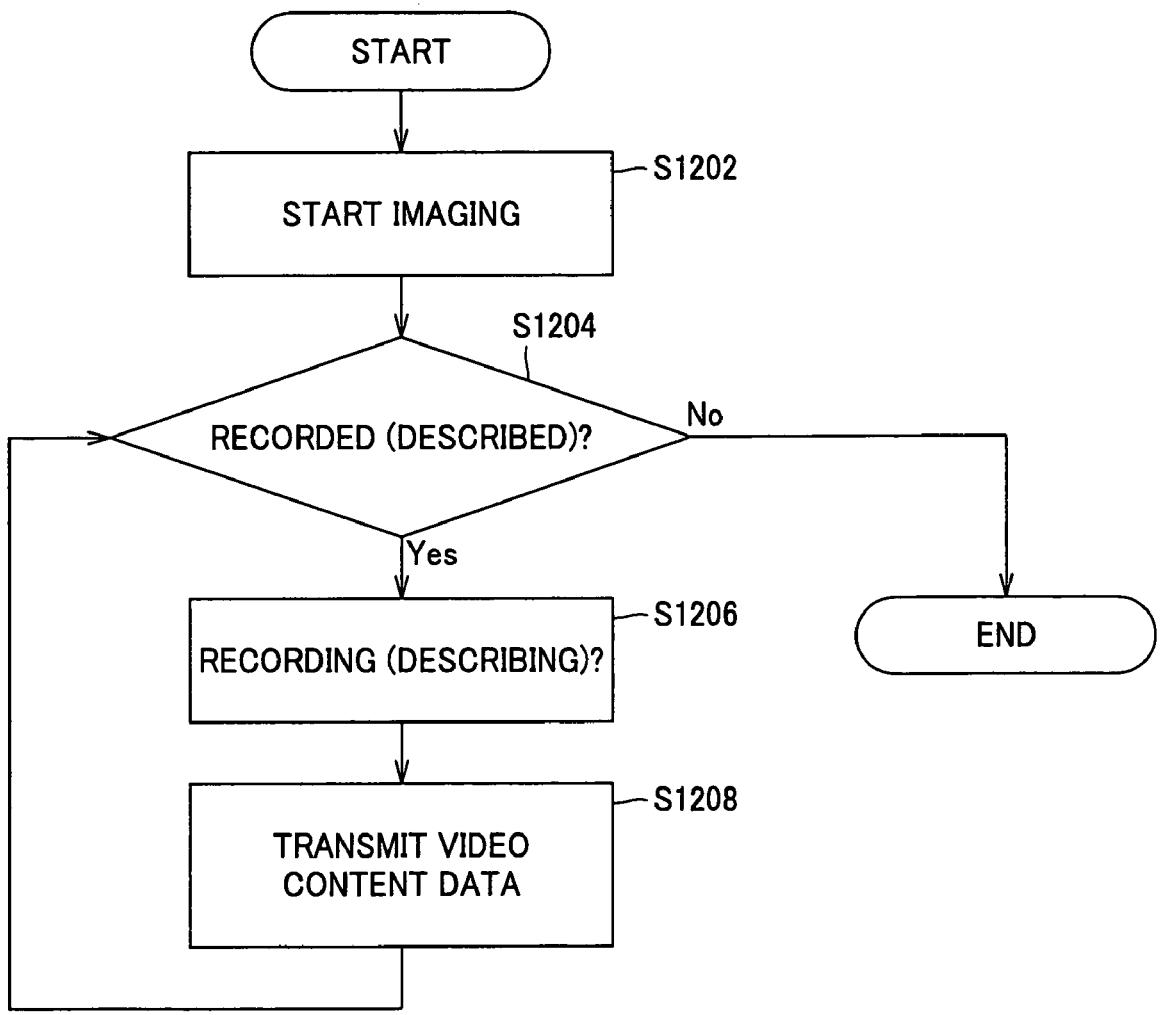
FIG. 13 shows a flow of operations made in recording data by the imaging device included in the video content editing support system according to the present invention.

First, recording (description) by the imaging device 2 will be explained with reference to FIGS. 3 and 13. FIG. 13 shows a flow of operations made in recording data by the imaging device included in the video content editing support system according to the present invention.

First of all, to image an object, the control switch 32 of the imaging device 2 is turned on. The set switch 40 is operated to set data such as a medium ID for the recording medium 14, a scene ID for a video content or an exposure time (time code) for description into the recording medium 14.

With the above setting, the data signal generator 41 generates time code data DT and user data DU. The time code data DT and user data DU are held in the time code data holder 42 and user data holder 43, respectively. The data thus held are outputted from the time code data holder 42 and user data holder 43, respectively.

When attribute mark data as scene ID for identification of a video scene and a mode in which electronic mark text data related with a video content such as date of imaging, location of imaging, etc. are to be described (recorded) are selected by operating the set switch 40, the data signal generator 41 will generate attribute mark data DZ and electronic mark text data DM on the basis of a position information signal from a GPS unit (not shown) included in the data signal generator 41 or the like.

The attribute mark data DZ and electronic mark text data DM are held in the attribute mark data holder 78 or electronic mark text data holder 45, and the data thus held are outputted from the attribute mark data holder 78 or electronic mark text data holder 45.

As shown in FIG. 13, when a VTR status signal indicating that the imaging device 2 is in recording operation is transmitted to the editor's terminal unit 4 and imaging is started by operating the control switch 32 (in step S1202), it is judged based on a motor control signal MC from the operation controller 33 whether the imaging device 2 is recording (in step S1204). When it is determined that the imaging device 3 is recording, a motor drive signal MD is transmitted by the motor controller 34 to the capstan motor 35 and drum motor 36. The recording medium (magnetic tape in this case) 14 starts being fed and the rotary head assembly 37 is put into rotation.

In case it is determined that the imaging device 2 is recording (describing) (in step S1204), a recording signal is transmitted from the digital signal recorder 71 to the rotary head assembly 37 on the basis of a mode signal MS supplied from the operation controller 33 and indicating that the imaging device 2 is in recording operation.

When electronic mark data is generated, the rotary head assembly 37 will describe electronic mark data and records a recording signal being described video content data to the helical track 82 shown in FIG. 6 (in step S1206). In this step of electronic content data recording (description) (step S1206), recording will continuously be effected while the imaging device 2 is recording (describing) (as in step S1204). It should be noted that the description of electronic mark data into video content data will be described in detail later.

The recording signal is transmitted to the controller 76, and then as video content data the editor's terminal unit 4 can display to the editor's terminal unit 4 via the communication unit 75 (in step S1208). It should be noted that before transmitting the recording signal, the video content data may be converted by compression or the like into a lower-resolution one.

Figure 14:
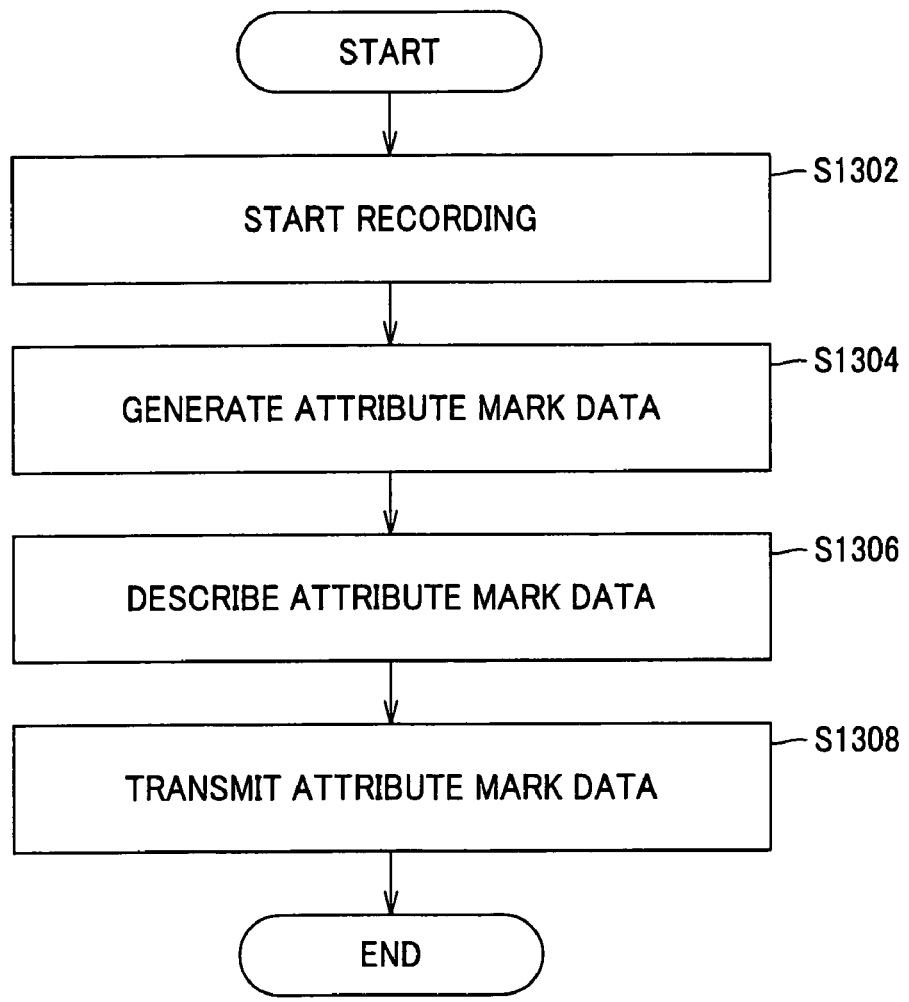
FIG. 14 shows a flow of operations made in describing attribute mark data by the imaging device included in the video content editing support system according to the present invention.

Next, description of attribute mark data by the imaging device 2 will be explained with reference to FIGS. 3 and 13. FIG. 14 shows a flow of operations made in describing attribute mark data by the imaging device included in the video content editing support system according to the present invention.

First, attribute mark data is described in the step of recording where the aforementioned video content data is recorded (step S1206) as shown in FIG. 13.

As shown in FIG. 14, when the imaging is started and a mode signal MS indicating that the imaging device 2 is in describing (recording) operation is transmitted to the monostable multivibrator 47, the latter will output a mode timing signal MT whose level is high "H" for a predetermined length of time to start a recording operation (in step S1302).

When the recording operation is started (as in step S1302), the data signal generator 41 will generate attribute mark data DZ (in step S1304). The attribute mark data DZ is held in the attribute mark data holder 78. Also, while the mode timing signal MT is high "H" in level, it sets the moving terminal of the signal select switch 49 at a terminal b.

In case the marker button 50 has not been operated, the level of a mark signal GW from the monostable multivibrator 51 will be low "L" in level, so that the moving terminal of the signal select switch 77 will be set at a terminal and attribute mark data DZ of the scene ID for identification of video scene be transmitted to the signal modulator 53.

Since the mode signal MS indicating that the imaging device 2 is in recording operation is transmitted to the recorder 54, a recording signal WS generated based on updated time code data DT and attribute mark data DZ is transmitted to the stationary head 55 and rotary head assembly 37, and the time code data DT is described (recorded) in the time code track TC on the recording medium 14 while being updated as shown in FIGS. 6 and 8. Further, the attribute mark data DZ being "Scene ID" for identification of a video scene is described (recorded) into the "User data" part included in the AUX signal field on the helical track 82 (in step S1306).

The recorder 54 having received the recording signal WS transmits the recording signal WS to the controller 76 in order to send the attribute mark data to the editor's terminal unit 4. The attribute mark data is KLV-coded as shown in FIG. 4 and transmitted to the editor's terminal unit 4 via the communication unit 75 (in step S1308).

Since the attribute mark data is metadata for identification of a video scene, it is described (recorded) in the recording medium 14 and storage unit 20 of the editor's terminal unit 4 and it will thus serve as reference data for identifying, from the editor's terminal unit 4, an object video scene existent in the recording medium 14.

Figure 15:
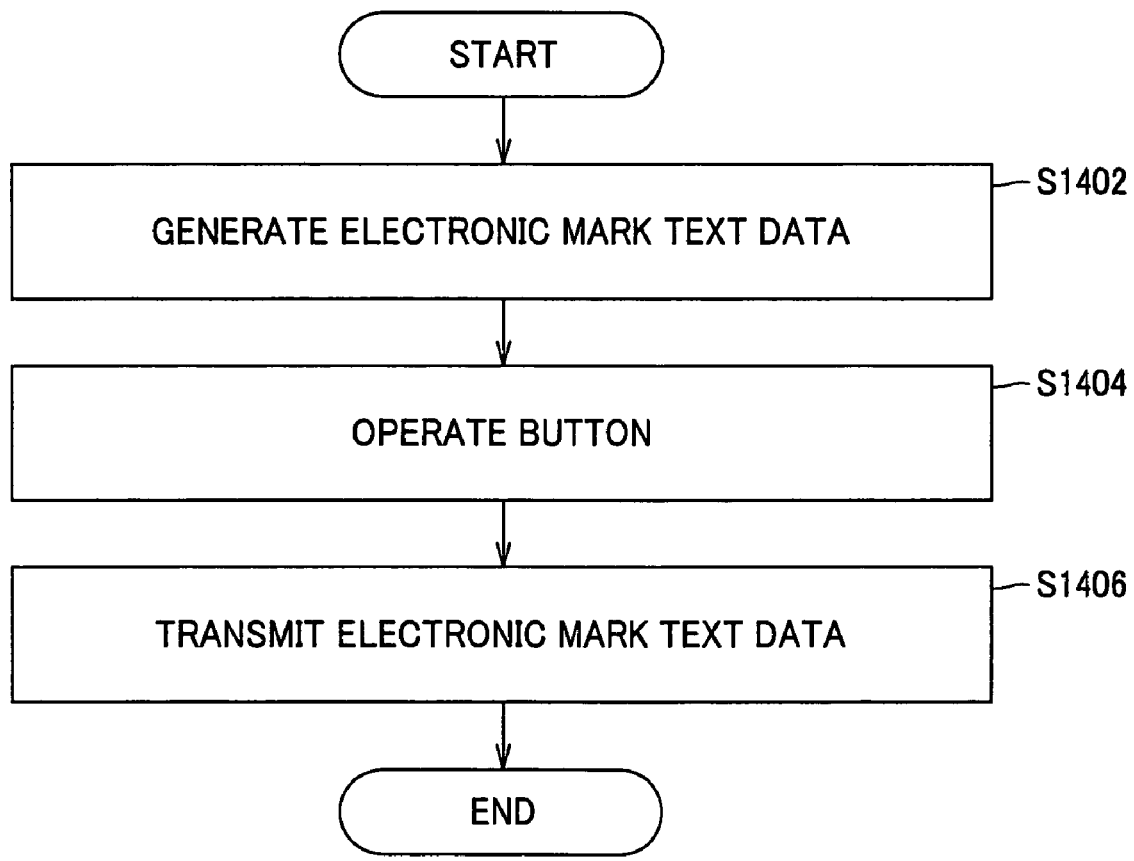
FIG. 15 shows a flow of operations made in describing electronic mark text data by the imaging device included in the video content editing support system according to the present invention.

Next, description of electronic mark text data by the imaging device 2 will be described with reference to FIG. 15. FIG. 15 shows a flow of operations made in describing electronic mark text data by the imaging device included in the video content editing support system according to the present invention.

First, while the imaging device 2 is in recording operation for recording the above video content data (as in step S1204) as shown in FIG. 13, electronic mark text data is described by operating the marker button 50.

Next, when the imaging device 2 is in recording operation (as in step S1204), a mode signal MS indicating that the imaging device 2 is in recording operation is transmitted to the monostable multivibrator 47 as shown in FIG. 15. Then, the monostable multivibrator 47 outputs a mode timing signal MT whose level is high "H" for a predetermined length of time and the data signal generator 41 generates electronic mark text data DM (in step S1402).

When a "REC start" button (not shown) included in the marker button 50 is pressed (in step S1404), a mark signal GW from the monostable multivibrator 51 will be high "H" in level for a predetermined length of time, so that the moving terminal of the signal select switch 77 will be set at a terminal b. Also, since the mark signal GW is high "H" for the predetermined length of time, a signal MR will also be high "H" for a predetermined length of time and the moving terminal of the signal select switch 49 be set at the terminal b.

Therefore, the signal modulator 53 is supplied with the electronic mark text data MD including "REC start". The recorder 54 having received the recording data signal WT transmits the recording signal WT to the stationary head 55 and the recording signal WS to the controller 76.

The controller 76 having received the electronic mark text data MD including the "REC start" and the recording signal WS including the time code data DT sends the electronic mark text data MD and time code data DT to the communication unit 75.

The communication unit 75 makes KLV coding of the received electronic mark text data including the "REC start" and time code data synchronous with the electronic mark text data as shown in FIG. 5, and transmits the KLV-coded data to the editor's terminal unit 4 (in step S1406).

When a "Highlight" button (not shown) included in the marker button 50 is operated in the case of an important scene such as "highlight" scene during recording operation, for example, during imaging by a video camera (in step S1404), electronic mark text data including text data ("highlight") corresponding to the type of the operated marker button 50 is KLV-coded as shown in FIG. 5 is transmitted to the editor's terminal unit 4 as above (in step S1406).

Note that similarly to the operation of the "Highlight" button (not shown) of the marker button 50, inputting a voice "highlight" to the microphone sound-converter 79 and recognizing the "highlight" input by means of the microphone sound-converter 79 permits to generate a control signal SG from which electronic mark text data on the voice "highlight" is generated.

Upon completion of the image recording, video content data including "Video scene 1" and "Video scene 2" are recorded to the recording medium 14 having video content data recorded therein, as shown in FIG. 11 or 12, for example.

As shown in FIG. 11 or 12, recording is started for each of "Video scene 1" and "Video scene 2", "Scene ID" 102 and "Scene ID" 110 as attribute mark data and time code data including "TC1" and "TC2" are described in video content data, and nearly at the same time, the attribute mark data and time code data are transmitted to the editor's terminal unit 4 including the storage unit 20.

Further, as shown in FIG. 11 or 12, electronic mark text data such as "IN", "Highlight", etc. generated by operating the marker button 50 or microphone sound-converter 79 are described into the storage unit 20 of the editor's terminal unit 4, and time code synchronous with the described electronic mark text data is also described into the storage unit 20 of the editor's terminal unit 4.

According to this embodiment of the present invention, electronic mark text data is not recorded to the recording medium 14 but to another recording medium such as the editor's terminal unit 4 as shown in FIGS. 11 and 12. However, the present invention is not limited to this embodiment but electronic mark data including electronic mark text data and attribute mark data may of course be described in the recording medium 14 without being described in any other recording medium as shown in FIG. 10.

Figure 16:
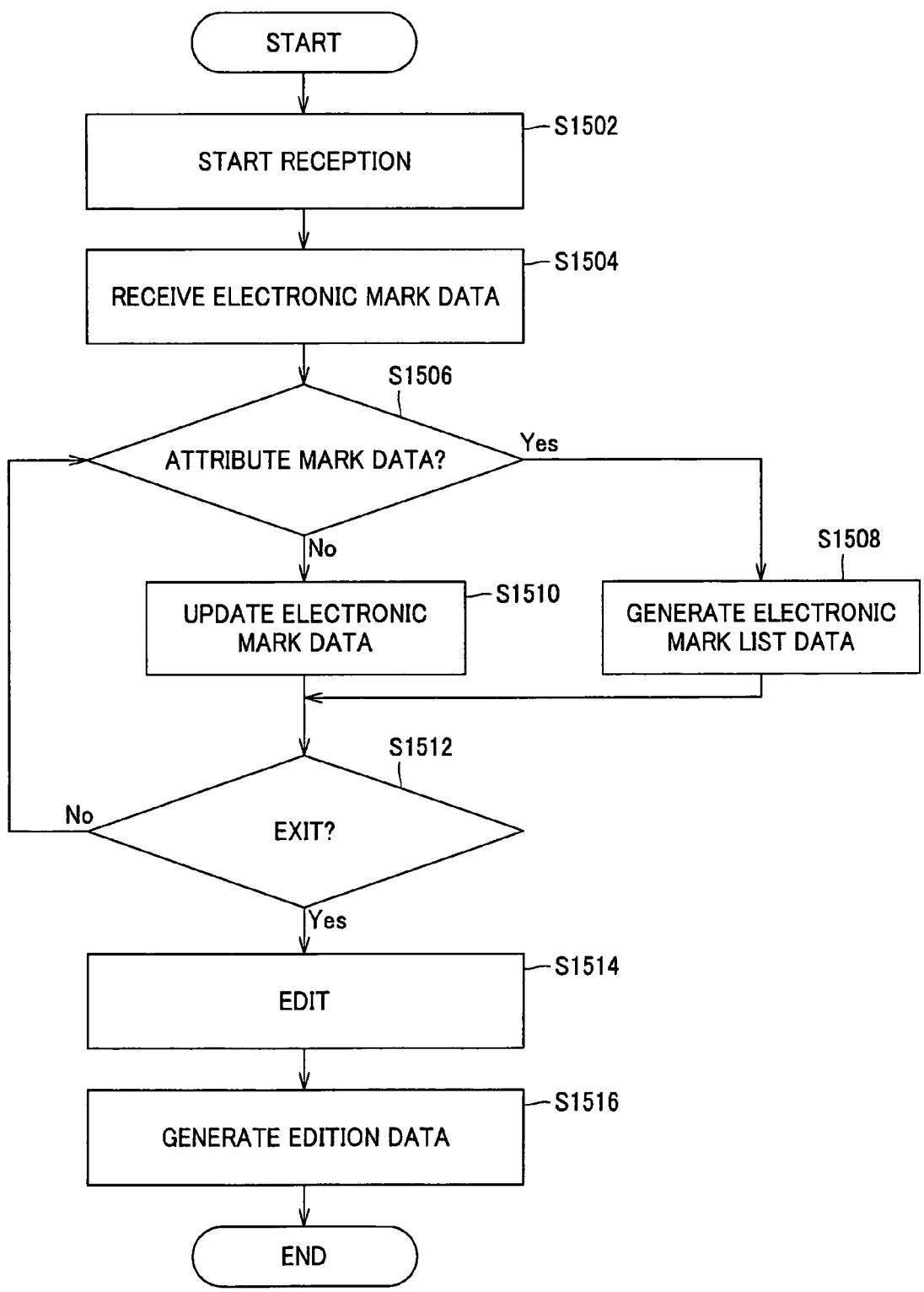
FIG. 16 shows a flow of operations made in receiving electronic mark data by the editor's terminal unit included in the video content editing support system according to the present invention.

Next, reception of electronic mark data by the editor's terminal unit 4 will be explained with reference to FIGS. 2 and 16. FIG. 16 shows a flow of operations made in receiving electronic mark data by the editor's terminal unit included in the video content editing support system according to the present invention.

First, the editor's terminal unit 4 is switched on before starting imaging with the imaging device 2 and "Medium ID" etc. for identification of the recording medium 14 to which the imaging device 2 will record data, so that the editor's terminal unit 4 will be able to receive electronic mark data, as shown in FIG. 16.

Next, when a VTR status signal indicating that the imaging device 2 is in recording operation is sent and imaging is started, the imaging device 2 transmits video content data, the communication unit 21 receives it (in step S1502), and the video content data is displayed at the display unit 22.

When electronic mark data is described by the imaging device 2 in the process of recording, KLV-coded electronic mark data is transmitted from the imaging device 2 to the editor's terminal unit 4 and the KLV-coded electronic mark data is sent to the communication unit 21 (in step S1504).

The CPU 23 judges which the received KLV-coded electronic mark data is, attribute mark data or electronic mark text data (in step S1506). When the KLV-coded electronic mark data is determined to be attribute mark data and no same attribute mark data is existent in the storage unit 20, scene ID block data included in electronic mark list data is generated (in step S1508).

In case the same attribute mark data is existent in the storage unit 20 or in case the electronic mark data is determined to be electronic mark text data, scene ID block data in the electronic mark list data is updated (in step S1510). It should be noted that the scene ID block data and electronic mark list data will be described in detail later.

Next, when the generation of electronic mark list data (as in step S1508) or updating of the electronic mark list data (as in step S1510) is over, it is judged based on the VTS status signal whether the imaging device 2 is in recording operation or not (in step S1512). When it is determined that the imaging device 2 is in recording operation, the reception of video content data (as in step S1502) is continued. When it is determined that the imaging device 2 is not in recording operation but has completed recording, editing is effected on the basis of an editing screen 1700 displayed at the display unit 22 (in step S1514). It should be noted that the editing screen 1700 displayed at the display unit 22 included in the present invention.

Next, when the editing of video content data based on the editing screen 1700 (as in step S1514) is complete, editing information data having recorded therein time code etc. of a video scene (from In point to Out point, for example) required for the edit is generated in the on-line editing (in step S1516). It should be noted that the editing information data used in this embodiment will be described in detail later.

Figure 17:
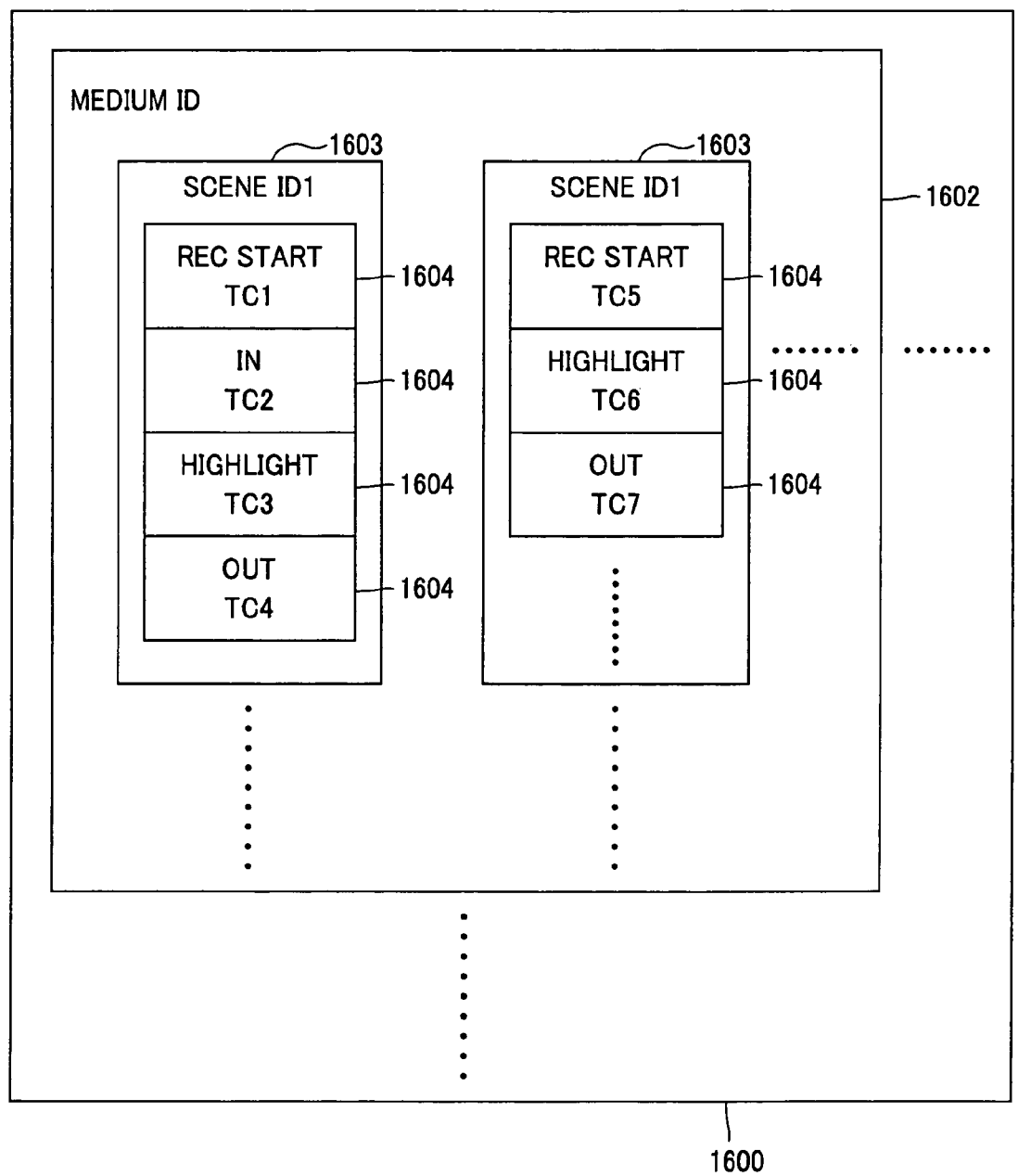
FIG. 17 schematically illustrates the structure of electronic mark list data in the video content editing support system according to the present invention.

Generation or updating of the electronic mark list data will be explained herebelow with reference to FIGS. 16 and 17. FIG. 17 schematically illustrates the structure of electronic mark list data used in the video content editing support system according to the present invention.

First, when the KLV-coded attribute mark data is received (in step S1506) as shown in FIG. 16, the CPU 23 will acquire "Material No." as attribute mark data shown in FIG. 4, and checks if the same attribute mark data is existent in the electronic mark list data stored in the storage unit 20.

Next, when no same attribute mark data exists, the electronic mark list generator 28 will generate electronic mark list data (in step S1508) as shown in FIG. 16.

Note here that as shown in FIG. 17, the electronic mark list data 1600 is stored in the storage unit 20 to and from which data can be written and read and it includes more than one or two medium ID block data 1602 for identification of the recording medium 14 to which data has been recorded by the imaging device 2, more than one or two scene ID block data 1603 for identification of a video scene, and more than one or two text block data 1604.

In case video content data is initially received from the editor's terminal unit 4, no data exists in the electronic mark list data 1600. For reception of the video content data, there will first be generated the medium ID block data 1602 as an medium ID for the recording medium 14 used in the imaging device 2.

Note that since the medium ID can be pre-registered in the recording medium 14 by the imaging device 2, video content data can be received without generation of the medium ID block data 1602 at the time of setting the reception of the video content data. Further, text data such as a storage location in the recording medium 14 can be registered as additional data in the medium ID.

For the same medium ID, the scene ID block data 1603 and text block data 1604 are added one after another to the medium ID block data 1602.

Next, "Scene ID" stored in the "Maternal No." part shown in FIG. 4 is acquired by the electronic mark list generator 28 from the received KLV-coded attribute mark data for generation of electronic mark list data.

Then, the electronic mark list generator 28 newly generates scene ID block data 1603 in the medium ID block data 1602 corresponding to an preset medium ID on the basis of the "Scene ID" for identification of a video scene.

Therefore, in the newly generated scene ID block data 1603, there will not existent any text block data 1604 until electronic mark text data is received.

Next, when KLV-coded electronic mark text data or time code data other than attribute mark data is received via the communication unit 21 as shown in FIG. 16, the electronic mark list generator 28 will update the electronic mark list data (in step S1510).

First for updating electronic mark list data, the electronic mark list generator 28 acquires text data or time code data stored in the "Value" part shown in FIG. 5 from the KLV-coded electronic mark text data or time code data.

Note that in case the acquired text data has a content seeming to have a special importance such as "Highlight", the electronic mark list generator 28 can order the CPU 23 to cause the display unit 22 to blink for attracting the editor's attention. Therefore, the editor's terminal unit 4 can be controlled by sending predetermined electronic mark data from the imaging unit 2 to the editor's terminal unit 4.

Next, the electronic mark list generator 28 adds the text block data 1604 to the latest scene ID block data 1603 and updates the acquired text data or time code data to the additional text block data 1604.

Each of the text block data 1604 is formed from a set of the acquired text data and time code synchronous with the acquired text data, and it is generated at each reception of text data and time code.

Note that although the present invention has been described concerning the example in which the text block data 1604 are generated in the order received by the editor's terminal unit 4, it is not limited to such an example but the text block data 1604 may be generated in the order of types of the received text data.

Also, although the present invention has been explained concerning the example in which each of the text block data 1604 is formed from a set of text data and time code data, it is not limited to this example but time code data may be additionally stored in text data of the same type for each type of the text data, for example.

Also, although the present invention has been explained concerning the example in which during recording, the electronic mark text data or time code data is real-time received from the imaging device 2 to generate the text block data 1604, it is not limited to this example but recorded attributed mark data, electronic mark text data and time code data can be collectively received from the imaging device 2 after completion of recording.

The editing screen 1700 according to the present invention will be explained below with reference to FIG. 18.

Figure 18:
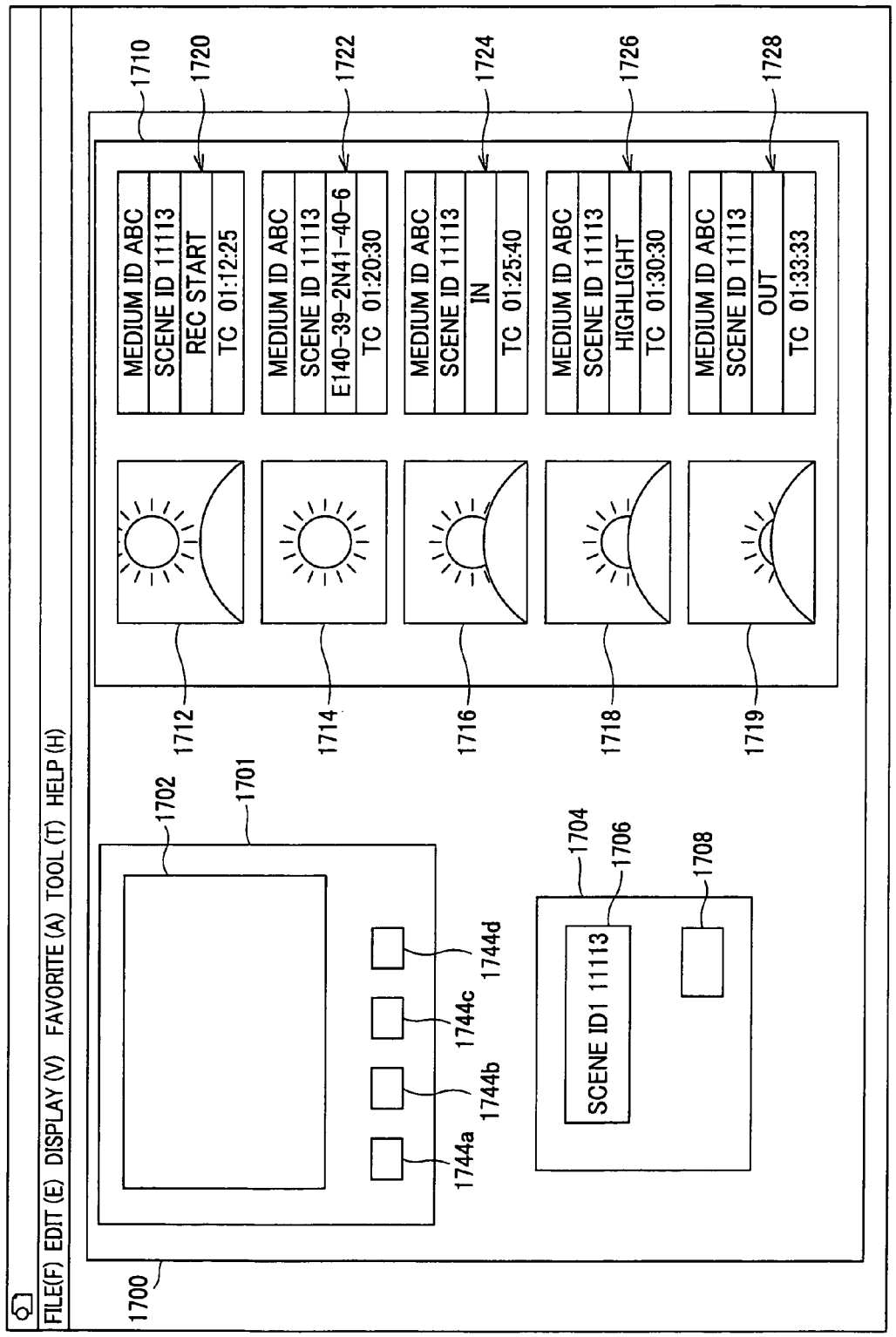
FIG. 18 explains an example of the editing screen displayed at the editor's terminal unit included in the video content editing support system according to the present invention.

FIG. 18 explains an example of the editing screen displayed at the editor's terminal unit included in the video content editing support system according to the present invention. The editing screen 1700 is intended for editing video content data by selecting necessary video content data on the basis of header information having described therein a feature of the video content data forming the electronic mark list data.

As shown in FIG. 18, the editing screen 1700 displayed at the display unit 22 includes a video screen part 1701 to display video content data real-time sent from the imaging device 2 or stored in the storage unit 20, an editing screen part 1710 to display text data as electronic text data, etc. and a retrieval part 1704 to retrieve an object video scene.

The video screen part 1701 includes a video screen 1702 to display video content data and electronic mark text buttons 1744 (1744a, 1744b, 1744c and 1744d) to describe electronic mark text data in the recording medium 14 of the imaging device 2. It should be noted that although the electronic mark text buttons 1744 in the editing screen 1700 according to this embodiment include four as shown in FIG. 18, the present invention is not limited to such a number of buttons but the buttons 1744, may include more than one or two buttons.

The editing screen part 1710 includes image display screens (1712, 1714, 1716, 1718 and 1819) each for displaying an image frame representative of video scenes having recorded therein electronic mark including attribute mark data or electronic mark text data, and mark displays (1720, 1722, 1724, 1726 and 1728) each for displaying an electronic mark.

Note that although the editing screen part 1701 in this embodiment includes five image display screens and five mark displays as shown in FIG. 18, the present invention is not limited to these numbers of image display screens and mark displays but the editing screen part 1710 may include ten such image display screens and ten mark displays, for example.

Each of the mark displays (1720, 1722, 1724, 1726 and 1728) includes a "Medium ID" part for identification of a recording medium, a "Scene ID" part for identification of a video scene, a "Text data" part for electronic mark text data, and a time code part "TC".

For example, the mark display part 1720 displays "ABC" in the "Medium ID" part, "11113" in the "Scene ID" part, "REC start" in the "Text data" part, and "01:12:25" in the "TC" part.

The "Text data" can be changed. "REC start" currently displayed can be changed to "Highlight No. 1", "First In" or the like.

"E140-39-2 N41-40-6" displayed in the "Text data" part of the mark display 1722 indicates a location of imaging, positioned by GPS included in the imaging device 2. That is, it means "140 degrees, 39 minutes and 2 seconds east longitude and 41 degrees, 40 minutes and 6 seconds north latitude".

Note that although the location of imaging is represented by a latitude and longitude in the above-mentioned example, the present invention is not limited to this indication but a location of imaging may be represented by a latitude and longitude or altitude.

Each of the mark displays (1720, 1722, 1724 and 1728) indicates electronic mark data described by operating any of the electronic mark text buttons 1744, marker button 50 or microphone sound-converter 79, and each of the image display screens (1712, 1714, 1716, 1718 and 1719) provides a real-time indication of an image of video content data synchronous with a location where electronic mark data is described.

In the off-line editing before the on-line one, the feature of a video scene is picked up based on indications in the mark displays (1720, 1722, 1724, 1726 and 1728) displayed in the editing screen part 1710, and a necessary video scene for the on-line editing is logged. That is, since text data indicated in the mark displays (1720, 1722, 1724, 1726 and 1728) are described when any characteristic event has taken place, a high efficiency of the logging can be attained by observing the image display screens (1712, 1714, 1716, 1718 and 1719) displayed on the editing screen part 1710.

An image displayed on the image display screen 1718 has the text data thereof displayed as "Highlight" in the mark display 1726. Therefore, it will easily be known that the image can be used as a highlight of a video scene ("Scene ID 11113").

Further, when it is desired to confirm a video scene again by checking the content of the video scene with reference of text data in the mark displays (1720, 1722, 1724, 1726 and 1728), it is possible to cue up a video scene corresponding to "Text data" or "Time code" specified in video content data stored in the storage unit 20 or recorded in the recording medium 14 of the imaging device 2 by selecting "Text data" or "Time code" displayed in the mark displays (1720, 1722, 1724, 1726 and 1728).

By changing the editing point (cue point) where there exists electronic mark data described in video content data, it is possible to change images displayed in the image display screens (1712, 1714, 1716, 1718 and 1719). In this case, by selecting images displayed in the image display screens (1712, 1714, 1716, 1718 and 1719), a video scene in the video content data recorded in the storage unit 20 is displayed in the video screen 1702 and editing point (cue point) in the electronic mark data can be changed.

Therefore, images displayed in the image display screens (1712, 1714, 1716, 1718 and 1719), in which "Text data" is "IN" (In point) or "OUT" (Out point), can be displayed in the video screen 1702, and the off-line editing in which video scenes to be used are acquired can be efficiently done from the editing screen 1700 of the editor's terminal unit 4 by checking the editing points without use of any other editing device.

Note that by transmitting change information on the changed "Text data", editing points or the like from the editor's terminal unit 4 to the imaging unit 2 via the network 16, the editing points (cue point) for the "Text data" or electronic mark data described in the recording medium 14 can be changed.

By entering an object "Text data" as keyword in a retrieval input part 1706 included in the retrieval unit 1704 and clicking a button 1708 by a mouse or similar pointing device, electronic mark data corresponding to the keyword can be retrieved from the electronic mark list data 1600 stored in the storage unit 20. As a result, an electronic mark data and corresponding image can be displayed in the mark display (1720, 1722, 1724, 1726 or 1728) and image display screen (1712, 1714, 1716, 1718 or 1719), respectively. Therefore, by retrieving the feature of a video scene or image which may be necessary for the on-line editing with the text data of electronic mark text data being taken as a keyword, it is possible to easily select an object video scene or image corresponding to the keyword.

The edit information data will be explained herebelow. The edit information includes editing points of a video scene such as EDL (edit decision list) recorded based on time code data, and on-line editing of video content data recorded in the recording medium 14 as a master is done based on the edit information data.

The above-mentioned edit information data can be stored in a recording medium 12 such as a memory stick as shown in FIG. 1 and be read by an on-line editing unit (not shown) used in the on-line editing. It should be noted that the edit information data can also be sent to the on-line editing unit via the network without using the recording medium 12.

Off-line editing including logging etc. can be done by the editor's terminal unit 4 in parallel to recording from the imaging device 2, and after completion of the off-line editing, edit information data can be generated for the on-line editing. Therefore, after completion of imaging, it is not necessary to re-check any necessary video scene for the on-line editing by replaying a VTR, which will contribute to an improved efficiency of the editing.

Further, by setting a keyword for a video scene required for the on-line editing on the basis of a text set in the "Text data"

part, the video scene selection to find an object video scene corresponding to the keyword can be done with an improved efficiency.

The present invention has been explained with reference to the accompanying drawings, but it is not limited to the embodiment having been described with reference to the drawings. Those skilled in the art will apparently be able to make modifications or corrections of the present invention within the technical idea set forth in the claims given later and such modifications and corrections are of course included in the technical scope of the present invention.

The aforementioned embodiment is such that electronic mark data is described by the imaging device 2, by way of example. However, the present invention is not limited to such an embodiment but an input device such as the marker button 50 or the recorder 54 may be provided for description of electronic mark data. For example, with the marker button 50 and recorder 54 being provided in the editor's terminal unit 4, the latter can receive video content data captured by the imaging device 2 and electronic mark data can be described in the video content data while recording the video content data to the recording medium.

In the foregoing, the present invention has been explained concerning the example in which a GPS system is provided to record information of a location of imaging in electronic mark text data. However, the present invention is not limited to this embodiment but information on the operation of the imaging device 2 such as a magnification factor of zooming of the imaging device 2, for example, can also be recorded in electronic mark text data.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

INDUSTRIAL APPLICABILITY

As having been described in the foregoing, the present invention can improved the efficiency of editing by implementing an off-line edit such as logging of necessary video scenes for the on-line editing on the basis of video content data recorded in parallel to imaging.

The invention claimed is:

1. A video content editing support system comprising:
a recorder to describe electronic mark data related to video content data corresponding to video content;
an electronic mark list generator to generate electronic mark list data including header information on the video content data; and
an editing unit to edit the video content data on the basis of the electronic mark list data;
wherein the electronic mark data comprises electronic mark text data that includes text data showing a user input,
wherein the electronic mark text data describes a feature of the video content data, and
wherein the electronic mark data includes attribute mark data and the electronic mark text data, wherein the electronic mark text data is associated with the attribute mark data, the attribute mark data identifying video scenes included in the video content data, and when, at an imaging device, the attribute mark data including a scene ID for identifying the video scenes and a mode associated with the electronic mark text data relating to an imaging location of the video content data are selected, the attribute mark data and the electronic mark text data are generated on the basis of position information from a Global Positioning System associated with the imaging device; and
wherein the attribute mark data and the electronic mark text data are generated in response to:
(i) time code data synchronous with a frame of the video content data; and
(ii) an input from a marker button or a microphone sound-convertor.

2. The system according to claim 1, wherein the recorder describes the video content data and electronic mark data on a nearly real-time basis.

3. The system according to claim 1, wherein the header information on the video content data is header information on video scenes included in the video content data.

4. The system according to claim 1, wherein the electronic mark data includes attribute mark data being attribute information on at least the video content data, and electronic mark text data in which a feature of the video content data is described.

5. The system according to claim 4, wherein the attribute mark data includes scene identifiers for identification of video scenes in at least video content data.

6. The system according to claim 1, wherein the electronic mark text data has described therein a feature, location of imaging or date of imaging of each video scene included in at least the video content data with text data.

7. The system according to claim 1, wherein the editing unit generates editing information data on the basis of the electronic mark list data and video content data.

8. The system according to claim 1, wherein the electronic mark data is be generated based on an input voice.

9. The video content editing support system of claim 1, wherein the attribute mark data includes a recording medium identifier for identification of a recording medium storing the video content data and a video scene identifier that distinguishes between video scenes included in the video content data.

10. The video content editing support system of claim 1, wherein the attribute mark is metadata for identification of a video scene.

11. An imaging device comprising:
a recorder which describes electronic mark data related to video content data corresponding to video content; and
a communication unit to couple an editor's terminal unit to the recorder, wherein the editor's terminal unit displays video content data and wherein the electronic mark data comprises electronic mark text data that includes text data showing a user input,
wherein the electronic mark text data describes a feature of the video content data, and
wherein the electronic mark data includes attribute mark data and the electronic mark text data, wherein the electronic mark text data is associated with the attribute mark data, the attribute mark data identifying video scenes included in the video content data, and when, at an imaging device, the attribute mark data including a scene ID for identifying video scenes and a mode associated with the electronic mark text data relating to an imaging location of the video content data are selected, the attribute mark data and the electronic mark text data are generated on the basis of position information from a Global Positioning System associated with the imaging device; and wherein the attribute mark data and the electronic mark text data are generated in response to:
(i) time code data synchronous with a frame of the video content data and
(ii) an input from a marker button or a microphone sound-convertor.

12. An editor's terminal unit comprising:
an editing unit to edit video content data on the basis of electronic mark data related to the video content data wherein the electronic mark data comprises electronic mark text data that includes text data showing a user input; and
a communication unit to couple the editor's terminal unit to an imaging device,
wherein the imaging device comprises a recorder to record captured video content data to a recording medium and wherein the imaging device displays the video content data,
wherein the electronic mark text data describes a feature of the video content data, and
wherein the electronic mark data includes attribute mark data and the electronic mark text data, wherein the electronic mark text data is associated with the attribute mark data, the attribute mark data identifying video scenes included in the video content data, and when, at an imaging device, the attribute mark data including a scene ID for identifying video scenes and a mode associated with the electronic mark text data relating to an imaging location of the video content data are selected, the attribute mark data and the electronic mark text data are generated on the basis of position information from a Global Positioning System associated with the imaging device; and
wherein the attribute mark data and the electronic mark text data are generated in response to:
(i) time code data synchronous with a frame of the video content data; and
(ii) an input from a marker button or a microphone sound-convertor.

13. A video content editing support method associated with video content, the method comprising the steps of:
describing electronic mark data related to video content data in the video content;
generating electronic mark list data including header information on the video content data; and
editing the video content data on the basis of the electronic mark list data;
wherein the electronic mark data comprises electronic mark text data that includes text data showing a user input,
wherein the electronic mark text data describes a feature of the video content data, and
wherein the electronic mark data includes attribute mark data and the electronic mark text data, wherein the electronic mark text data is associated with the attribute mark data, the attribute mark data identifying video scenes included in the video content data, and when, at an imaging device, the attribute mark data including a scene ID for identifying video scenes and a mode associated with the electronic mark text data relating to an imaging location of the video content data are selected, the attribute mark data and the electronic mark text data are generated on the basis of position information from a Global Positioning System associated with the imaging device, and
wherein the attribute mark data and the electronic mark text data are generated in response to:
(i) time code data synchronous with a frame of the video content data; and
(ii) an input from a marker button or a microphone sound-convertor.

* * * * *